United States Patent
Bang et al.

(10) Patent No.: US 11,765,755 B2
(45) Date of Patent: Sep. 19, 2023

(54) METHOD AND APPARATUS FOR TRANSMITTING AND RECEIVING CONTROL CHANNEL IN WIRELESS COMMUNICATION SYSTEM

(71) Applicant: Samsung Electronics Co., Ltd., Suwon-si (KR)

(72) Inventors: Jonghyun Bang, Suwon-si (KR); Taehyoung Kim, Suwon-si (KR); Jinyoung Oh, Suwon-si (KR); Hyunseok Ryu, Suwon-si (KR); Sungjin Park, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/832,137

(22) Filed: Mar. 27, 2020

(65) Prior Publication Data
US 2020/0314856 A1 Oct. 1, 2020

(30) Foreign Application Priority Data

Mar. 29, 2019 (KR) .......... 10-2019-0037119
Jun. 4, 2019 (KR) .......... 10-2019-0066133
(Continued)

(51) Int. Cl.
*H04W 72/53* (2023.01)
*H04W 72/0453* (2023.01)
(Continued)

(52) U.S. Cl.
CPC .......... *H04W 72/53* (2023.01); *H04L 1/1614* (2013.01); *H04L 5/0092* (2013.01); *H04W 24/08* (2013.01); *H04W 72/0453* (2013.01)

(58) Field of Classification Search
CPC ......... H04W 72/0493; H04W 72/0453; H04W 24/08; H04W 48/12; H04W 72/042;
(Continued)

(56) References Cited

U.S. PATENT DOCUMENTS

2018/0279289 A1 9/2018 Islam et al.
2018/0368116 A1 12/2018 Liao et al.
(Continued)

OTHER PUBLICATIONS

U.S. Appl. No. 62/722,099, Specification (Year: 2018).*
(Continued)

*Primary Examiner* — Yu-Wen Chang
(74) *Attorney, Agent, or Firm* — Jefferson IP Law, LLP

(57) ABSTRACT

A method of performing communication by a user equipment (UE) that is configured with a control resource set (CORESET) by a base station in a wireless communication system is provided. The method includes receiving configuration information of a CORESET, receiving configuration information of a search space, determining, based on the configuration of the search space, a subband to which the configuration information of the CORESET is to be applied, from among at least one subband within a bandwidth part, identifying a CORESET in the at least one subband based on a result of the determining, and performing monitoring in the identified CORESET for reception of a physical downlink control channel (PDCCH).

18 Claims, 14 Drawing Sheets

(30) Foreign Application Priority Data

Sep. 4, 2019 (KR) .................. 10-2019-0109712
Feb. 28, 2020 (KR) .................. 10-2020-0025533

(51) Int. Cl.
*H04L 1/1607* (2023.01)
*H04W 24/08* (2009.01)
*H04L 5/00* (2006.01)

(58) Field of Classification Search
CPC ... H04L 1/1614; H04L 5/0092; H04L 1/1887; H04L 1/1822; H04L 1/1896; H04L 1/08; H04L 5/0094; H04L 5/0053
See application file for complete search history.

(56) References Cited

U.S. PATENT DOCUMENTS

| | | | |
|---|---|---|---|
| 2019/0158326 A1* | 5/2019 | Liao | H04L 5/0048 |
| 2019/0222357 A1* | 7/2019 | Huang | H04L 1/1614 |
| 2020/0021419 A1* | 1/2020 | Taherzadeh Boroujeni | H04L 5/0053 |
| 2020/0112484 A1* | 4/2020 | Sun | H04L 5/003 |
| 2020/0154295 A1* | 5/2020 | Lin | H04W 76/28 |
| 2020/0280971 A1* | 9/2020 | Moon | H04L 5/0094 |
| 2021/0092622 A1* | 3/2021 | Tiirola | H04L 5/0092 |
| 2021/0185721 A1* | 6/2021 | Cheng | H04L 1/1621 |
| 2021/0288852 A1* | 9/2021 | Jia | H04W 72/042 |
| 2022/0039158 A1* | 2/2022 | Awadin | H04W 72/23 |
| 2022/0061094 A1* | 2/2022 | Jung | H04W 72/542 |
| 2022/0150008 A1* | 5/2022 | Schober | H04L 5/0092 |

OTHER PUBLICATIONS

U.S. Appl. No. 62/786,123,Specification (Year: 2018).*
U.S. Appl. No. 62/758,407,Specification (Year: 2018).*
U.S. Appl. No. 62/742,255,Specification (Year: 2018).*
Huawei, HiSilicon, "DL channels and signals in NR unlicensed band", 3GPP TSG RAN WG1 Meeting #96, Athens, Greece, Feb. 25-Mar. 1, 2019, R1-1901523, Feb. 15, 2019.
Hokia, Nokia Shanghai Bell, "On the Frame structure and Wideband operation for NR-U", 3GPP TSG RAN WG1 Meeting #94bis, Chengdu, China, Oct. 8-12, 2018, R1-1810613, Sep. 28, 2018.
Samsung, "Remaining Issues on PDCCH and Search Space Design", 3GPP TSG RAN WG1 Meeting #94, Gothenburg, Sweden, Aug. 20-24, 2018, R1-1808753, Aug. 10, 2018.
LG Electronics, "Summary #2 on wide-band operation for NR-U", 3GPP TSG RAN WG1 #96, Athens, Greece, Feb. 25-Mar. 1, 2019, R1-1903595, Mar. 3, 2019.
International Search Report dated Jul. 6, 2020, issued in International Patent Application No. PCT/KR2020/004259.
Qualcomm Incorporated; Remaining issues on control resource set and search space; 3GPP TSG RAN WG1 Meeting #93; R1-1807353; XP 51442545A; May 21-25, 2018; Busan, Korea.
ZTE; CR on using CORESET#0 in dedicated DL BWP; 3GPP TSG RAN WG1 Meeting # 96; R1-1903652; XP 51690312A; Feb. 25-Mar. 1, 2019; Athens, Greece.
Extended European Search Report dated Apr. 4, 2022; European App. No. 20784794.8.
European Communication pursuant to Article 94(3) EPC dated Mar. 22, 2023; European Appln. No. 20 784 794.8-1213.

\* cited by examiner

METHOD AND APPARATUS FOR TRANSMITTING AND RECEIVING CONTROL CHANNEL IN WIRELESS COMMUNICATION SYSTEM

CROSS-REFERENCE TO RELATED APPLICATIONS

This application is based on and claims priority under 35 U.S.C. § 119(a) of a Korean patent application number 10-2019-0037119, filed on Mar. 29, 2019, a Korean patent application number 10-2019-0066113, filed on Jun. 4, 2019, a Korean patent application number 10-2019-0109712, filed on Sep. 4, 2019, and a Korean patent application number 10-2020-0025533, filed on Feb. 28, 2020, in the Korean Intellectual Property Office, the disclosures of each of which are incorporated by reference herein in their entireties.

BACKGROUND

1. Field

The disclosure relates to a method and apparatus for transmitting and receiving a control channel in a wireless communication system. The disclosure may include a method of configuring a search space in order for a base station or terminal to transmit and receive a control channel.

2. Description of Related Art

Efforts have been made to develop an improved $5^{th}$ generation (5G) communication system or pre-5G communication system to keep up with growing wireless data traffic demand after the commercialization of $4^{th}$ generation (4G) communication systems. For this reason, the 5G or pre-5G communication system is called a beyond 4G network communication system or a post long-term evolution (LTE) system. A 5G communication system defined in 3rd Generation Partnership Project (3GPP) standards is called a new radio (NR) system.

Implementation of 5G communication systems in an ultra-high-frequency (millimeter wave (mmW)) band (such as a 60-GHz band) is under consideration to achieve high data transfer rates. To mitigate path loss and increase transmission distance during radio wave propagation in an ultra-high-frequency band for 5G communication systems, various technologies such as beamforming, massive multiple-input multiple-output (MIMO), full dimensional MIMO (FD-MIMO), array antennas, analog beamforming, and large-scale antennas are being studied.

Furthermore, to improve system networks for 5G communication systems, various technologies are currently being developed, including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation. Furthermore, for 5G systems, advanced coding modulation (ACM) schemes such as Hybrid frequency shift key (FSK) and quadrature amplitude modulation (QAM) (FQAM) and Sliding Window Superposition Coding (SWSC) and advanced access techniques such as Filter Bank Multicarrier (FBMC), non-orthogonal multiple access (NOMA), sparse code multiple access (SDMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which IoT technology is combined with, for example, technology for processing big data through connection with a cloud server. To implement the IoT, technologies such as sensing technology, wired/wireless communication and network infrastructure, service interface technology, and security technology are required, and thus, research has recently been conducted into technologies such as sensor networks for interconnecting objects, machine to machine (M2M) communication, and machine type communication (MTC). In an IoT environment, intelligent Internet technology services may be provided to create a new value for human life by collecting and analyzing data obtained from interconnected objects. The IoT can be applied to various fields such as smart homes, smart buildings, smart cities, smart cars or connected cars, smart grids, health care, smart home appliances, advanced medical services, etc., through convergence and integration between existing information technology (IT) and various industries.

Thus, various attempts are being made to apply a 5G communication system to the IoT network. For example, technologies, such as sensor networks, M2M communication, MTC, etc., are implemented using techniques for 5G communication, including beamforming, MIMO, and array antennas. The application of the above-described Cloud RAN as a big data processing technology is an example of convergence between 5G and IoT technologies.

As various services may be provided according to the aforementioned technical features and the development of mobile communication systems, there is a need for a method of effectively providing such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing a service in a mobile communication system.

Additional aspects will be set forth in part in the description which follows and, in part, will be apparent from the description, or may be learned by practice of the presented embodiments of the disclosure.

In accordance with an aspect of the disclosure, a method of performing communication by a user equipment (UE) that is configured with a control resource set (CORESET) by a base station in a wireless communication system is provided. The method includes receiving configuration information of a CORESET, receiving configuration information of a search space, determining, based on the configuration of the search space, a subband to which the configuration information of the CORESET is to be applied, from among at least one subband within a bandwidth part, identifying a CORESET in the at least one subband based on a result of the determining, and performing monitoring in the identified CORESET for reception of a physical downlink control channel (PDCCH).

The configuration information of the search space may include bitmap information indicating the subband to which the configuration information of the CORESET is to be applied, and the configuration information of the CORESET may include bitmap information indicating a frequency resource of the CORESET.

The identifying of the CORESET may include, when the configuration information of the CORESET does not include configuration information of an offset value or the offset value is set to a default value, and the configuration information of the search space does not include bitmap information indicating the subband to which the configuration information of the CORESET is to be applied, identifying the CORESET based on bitmap information included in the configuration information of the CORESET and indicating a frequency resource of the CORESET in units of a group of six (6) physical resource blocks (PRBs) based on a common RB (CRB) in the bandwidth part.

The identifying of the CORESET may include, when the configuration information of the CORESET includes configuration information of an offset value and the configuration information of the search space does not include bitmap information indicating the subband to which the configuration information of the CORESET is to be applied, identifying the CORESET based on the offset value and bitmap information included in the configuration information of the CORESET and indicating a frequency resource of the CORESET in units of a group of 6 PRBs based on a CRB in the bandwidth part.

The identifying of the CORESET may include, when the configuration information of the CORESET does not include configuration information of an offset value or the offset value is set to a default value, and the configuration information of the search space includes bitmap information indicating the subband to which the configuration information of the CORESET is to be applied, identifying the CORESET based on bitmap information included in the configuration information of the CORESET and indicating a frequency resource of the CORESET in units of a group of 6 PRBs based on a starting PRB of the subband to which the configuration information of the CORESET is to be applied.

The identifying of the CORESET may include, when the configuration information of the CORESET includes configuration information of an offset value and the configuration information of the search space includes bitmap information indicating the subband to which the configuration information of the CORESET is to be applied, identifying the CORESET based on the offset value and bitmap information included in the configuration information of the CORESET and indicating a frequency resource of the CORESET in units of a group of 6 PRBs based on a starting PRB of the subband to which the configuration information of the CORESET is to be applied.

The method may further include receiving information about a gap between the at least one subband within the bandwidth part, and the identifying of the CORESET may include identifying the CORESET by further taking into account the information about the gap between the at least one subband.

The performing of the monitoring may include performing the monitoring only in at least one subband determined to be an idle band from among the at least one subband.

The method may further include receiving information about a result of performing a channel access procedure from the base station, and in the performing of the monitoring, predetermined physical downlink control channel (PDCCH) candidates may not be monitored in a RB determined to be unusable based on the received result of performing the channel access procedure.

In accordance with another aspect of the disclosure, a method of performing communication by a base station configuring a CORESET in a wireless communication system is provided. The method includes transmitting configuration information of a CORESET, transmitting configuration information of a search space, and transmitting a PDCCH via a CORESET in at least one subband within a bandwidth part, which is determined based on the configuration information of the CORESET and the configuration information of the search space.

In accordance with another aspect of the disclosure, a user equipment configured with a CORESET by a base station in a wireless communication system is provided. The user equipment includes a transceiver; and a processor combined with the transceiver and configured to, receive configuration information of the CORESET, receive configuration information of a search space, determine, based on the configuration information of the search space, a subband to which the configuration information of the CORESET is to be applied, from among at least one subband within a bandwidth part, identify a CORESET in the at least one subband based on a result of the determining, and perform monitoring in the identified CORESET for reception of a PDCCH.

The processor may be further configured to, when the configuration information of the CORESET does not include configuration information of an offset value or the offset value is set to a default value, and the configuration information of the search space does not include bitmap information indicating the subband to which the configuration information of the CORESET is to be applied, identify the CORESET based on bitmap information included in the configuration information of the CORESET and indicating a frequency resource of the CORESET in units of a group of six (6) PRBs based on a CRB in the bandwidth part.

The processor may be further configured to, when the configuration information of the CORESET includes configuration information of an offset value and the configuration information of the search space does not include bitmap information indicating the subband to which the configuration information of the CORESET is to be applied, identify the CORESET based on the offset value and bitmap information included in the configuration information of the CORESET and indicating a frequency resource of the CORESET in units of a group of 6 PRBs based on a CRB in the bandwidth part.

The processor may be further configured to, when the configuration information of the CORESET does not include configuration information of an offset value or the offset value is set to a default value, and the configuration information of the search space includes bitmap information indicating the subband to which the configuration information of the CORESET is to be applied, identify the CORESET based on bitmap information included in the configuration information of the CORESET and indicating a frequency resource of the CORESET in units of a group of 6 PRBs based on a starting PRB of the subband to which the configuration information of the CORESET is to be applied.

The processor may be further configured to, when the configuration information of the CORESET includes configuration information of an offset value and the configuration information of the search space includes bitmap information indicating the subband to which the configuration information of the CORESET is to be applied, identify the CORESET based on the offset value and bitmap information included in the configuration information of the CORESET and indicating a frequency resource of the CORESET in units of a group of 6 PRBs based on a starting PRB of the subband to which the configuration information of the CORESET is to be applied.

The processor may be further configured to, receive information about a gap between the at least one subband within the bandwidth part, and identify the CORESET by further taking into account the information about the gap between the at least one subband.

The processor may be further configured to perform the monitoring only in at least one subband determined to be an idle band from among the at least one subband.

The processor may be further configured to receive information about a result of performing a channel access procedure from the base station, and predetermined PDCCH candidates may not be monitored in a RB determined to be unusable based on the received result of performing the channel access procedure.

In accordance with another aspect of the disclosure, a base station for configuring a CORESET in a wireless communication system is provided. The base station includes a transceiver, and a processor combined with the transceiver and configured to, transmit configuration information of a CORESET; transmit configuration information of a search space, and transmit a PDCCH via a CORESET in at least one subband within a bandwidth part, which is determined based on the configuration information of the CORESET and the configuration information of the search space.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
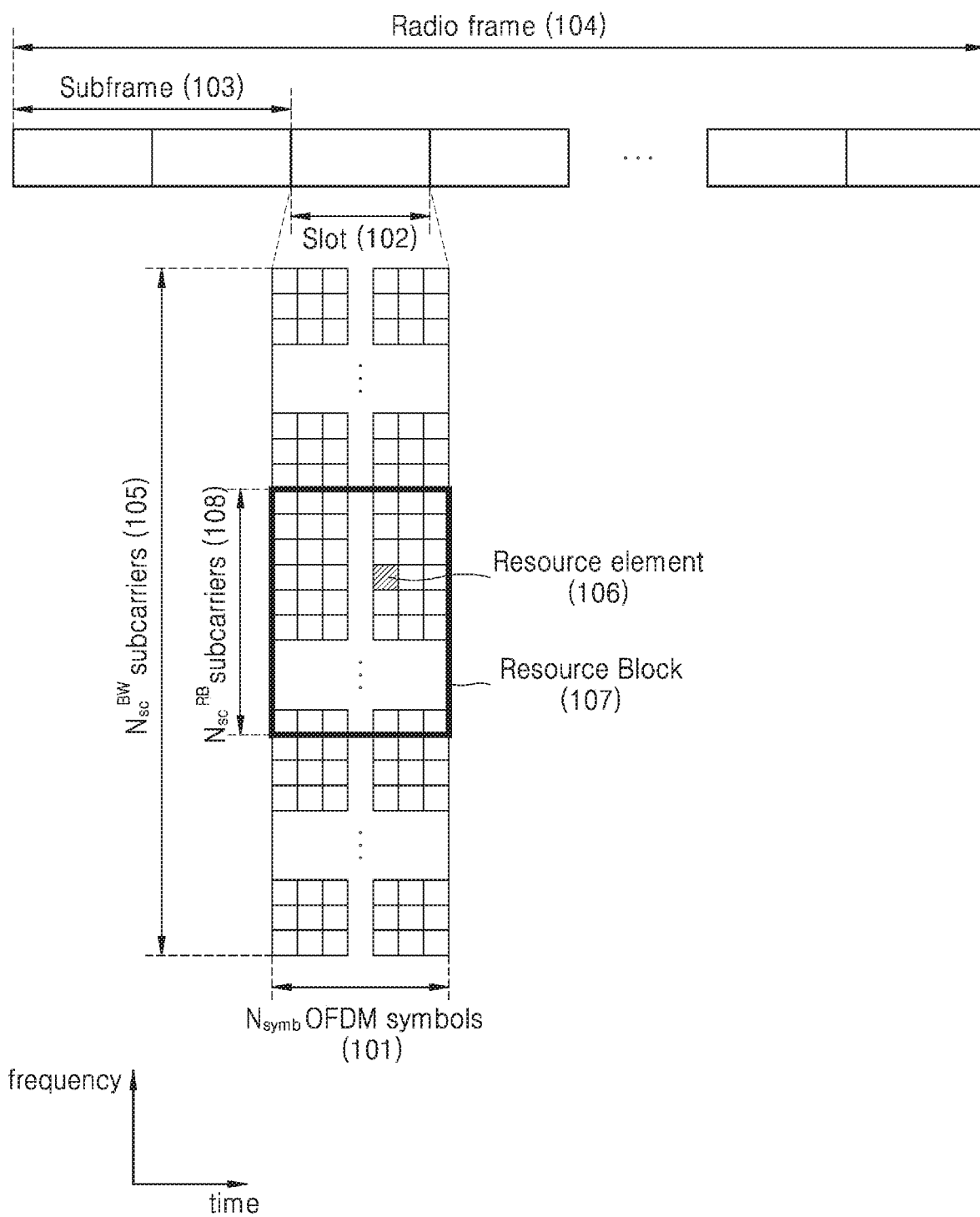
FIG. 1 illustrates an uplink or downlink time-frequency domain transmission structure in a new radio (NR) or 5$^{th}$ generation (5G) communication system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantageous and features of the disclosure and methods of accomplishing the same will be more readily appreciated by referring to the following description of embodiments of the disclosure in conjunction with the accompanying drawings. However, the disclosure may be embodied in many different forms and should not be construed as being limited to the embodiments of the disclosure set forth herein. Rather, the embodiments of the disclosure are provided so that the disclosure will be thorough and complete and will fully convey the concept of the disclosure to those of ordinary skill in the art, and the disclosure will only be defined by the appended claims. Throughout the specification, like reference numerals refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, embodiments of the disclosure will be described in detail with reference to the accompanying drawings.

In the following description of embodiments, descriptions of technical features that are well known in the art to which the disclosure pertains and are not directly related to the disclosure are omitted. This is for clearly describing the essence of the disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the disclosure and methods of accomplishing the same will be more readily appreciated by referring to the following description of embodiments and the accompanying drawings. However, the disclosure may be embodied in many different forms and should not be construed as being limited to the disclosed embodiments set forth herein. Rather, the embodiments of the disclosure are provided so that the disclosure will be thorough and complete and will fully convey the concept of the disclosure to those of ordinary skill in the art, and the disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed via the processor of the computer or other programmable data processing equipment create a means for performing functions specified in the flowchart block(s). The computer program instructions may also be stored in a computer-usable or computer-readable memory capable of directing a computer or another programmable data processing apparatus to implement functions in a specific manner, and thus, the instructions stored in the computer-usable or computer-readable memory may produce an article of manufacture including the instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, according to some embodiments, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, according to some embodiments, the "unit" may include one or more processors.

In a $5^{th}$ generation (5G) system, compared to an existing $4^{th}$ generation (4G) system, supports for various services are considered. For example, the most representative services of the 5G system may include an enhanced mobile broadband (eMBB) service, an ultra-reliable and low latency communication (URLLC) service, a massive machine type communication (mMTC) service, a next-generation broadcasting service such as evolved multimedia broadcast/multicast service (eMBMS), etc. A system for providing the URLLC service and a system for providing the enhanced mobile broadband (eMBB) services may be respectively referred to as a URLLC system and an eMBB system. Furthermore, the terms "service" and "system" may be used interchangeably.

In this way, a communication system may provide a plurality of services to a user. To provide the plurality of services to the user, a method capable of providing individual services in the same time period according to characteristics of the services and an apparatus employing the method may be required.

According to an embodiment of the disclosure, in a wireless communication system, a system and a node for receiving a downlink signal or a system or a node for transmitting a downlink signal may configure a control resource set (CORESET) in consideration of subbands, thereby improving the efficiency of downlink control channel reception and monitoring.

Moreover, in a wireless communication system such as a long-term evolution (LTE) or LTE-Advanced (LTE-A) system or a 5G new ratio (NR) system, downlink control information (DCI), including resource allocation information for transmitting a downlink signal transmitted from a base station to a UE, may be transmitted through a physical downlink control channel (PDCCH). The base station may configure the UE to receive at least one downlink signal carried on DCI (e.g., channel-state information reference signal (CSI-RS)), a broadcast channel (physical broadcast channel (PBCH)), or a downlink data channel (physical downlink shared channel (PDSCH)).

For example, the base station may transmit to the UE DCI indicating that the UE should receive a PDSCH in subframe n via a PDCCH. The UE that has received the DCI may receive the PDSCH in the subframe n according to the received DCI. Furthermore, in the LTE or LTE-A or NR system, the base station may transmit, via the PDCCH, DCI including an uplink resource allocation information to the UE. Through the above-described operations, the base station may configure the UE to transmit to the base station at least one uplink signal carried on uplink control information (UCI) (e.g., a sounding reference signal (SRS) or physical random access channel (PRACH)) or an uplink data channel (physical uplink shared channel (PUSCH)). For example, the UE that has received, in subframe n, uplink transmission configuration information (or uplink DCI or UL grant) transmitted from the base station via a PDCCH may perform uplink data channel transmission (hereinafter, referred to as PUSCH transmission) according to a predefined time (e.g., n+4), a time configured via a higher layer signal (e.g., n+k), or uplink signal transmission time indicator information (e.g., n+k) contained in the uplink transmission configuration information.

When a configured downlink transmission is transmitted from the base station to the UE over a unlicensed band or when a configured uplink transmission is transmitted from the UE to the base station over an unlicensed band, the transmitting device (the base station or UE) may perform, before or immediately before the start of a configured signal transmission, a channel access procedure (or listen-before-talk (LBT)) on the unlicensed band in which the signal transmission is configured. When it is determined, based on a result of performing the channel access procedure, that the unlicensed band is in an idle state, the transmitting device may access the unlicensed band to perform the configured signal transmission.

On the other hand, when it is determined, based on the result of performing the channel access procedure, that the unlicensed band is not in an idle state or that the unlicensed band is occupied, the transmitting device is unable to access the unlicensed band and accordingly may not perform the configured signal transmission.

A channel access procedure on an unlicensed band where a signal transmission is configured may generally be performed as follows. A transmitting device may receive a signal in the unlicensed band for a predetermined time or for a time calculated according to a predefined rule (e.g., a time calculated through at least one random value selected by the base station or UE). The transmitting device may determine whether the unlicensed band is in an idle state by comparing a strength of the received signal with a threshold predefined or calculated using a function consisting of at least one parameter from among a channel bandwidth, a bandwidth over which a signal to be transmitted is transmitted, a strength of a transmit power, and a beam width for a transmission signal.

For example, when a strength of a signal received by the transmitting device for 25 microseconds (μs) is less than a predefined threshold of −72 decibel-milliwatts (dBm), the transmitting device may determine that the unlicensed band is in an idle state and perform the configured signal transmission. In this case, a maximum time available for the signal transmission may be limited by a maximum channel occupancy time (MCOT) in an unlicensed band defined for each country or geographical region, or by a type of a transmitting device (e.g., a base station or UE, or a master device or slave device). For example, in Japan, a base station or UE may perform a channel access procedure in an unlicensed 5 GHz spectrum and then transmit a signal by occupying a channel for a maximum of 4 ms without performing an additional channel access procedure. When the strength of the signal received for 25 μs is greater than the predefined threshold of −72 dBm, the transmitting device, e.g., the base station, may determine that the unlicensed band is not in an idle state and may not transmit the signal.

In a 5G communication system, to provide various services and support high data transfer rates, various techniques have been introduced, including a technique for transmitting an uplink signal without retransmission in units of code block groups and uplink scheduling information. Thus, when the 5G communication system is to operate via an unlicensed band, there is a need for a more efficient channel access procedure considering various parameters.

Wireless communication systems have progressed beyond providing initial voice-centered services into broadband wireless communication systems that provide high-speed, high-quality packet data services based on communication standards such as $3^{rd}$ Generation Partnership Project (3GPP)'s High Speed Packet Access (HSPA), LTE or Evolved Universal Terrestrial Radio Access (E-UTRA), LTE-A, 3GPP2's High Rate Packet Data (HRPD), Ultra Mobile Broadband (UMB), and IEEE's 802.16e. Furthermore, 5G or NR communication standards are being developed for 5G wireless communication systems.

In wireless communication systems including the 5G wireless communication systems as described above, at least one service from among enhanced mobile broadband (eMBB), massive machine type communications (mMTC), and ultra-reliable and low-latency communications (URLLC) services may be provided to a UE. The above-described services may be provided to the same UE during the same time period. According to an embodiment of the disclosure, the eMBB service may aim at high-speed transmission of high-capacity data, the mMTC service may aim to minimize UE power consumption and provide connection to multiple terminals, and the URLLC service may aim at high reliability and low delay, but are not limited thereto. Furthermore, the three services may be fundamental scenarios for systems such as LTE systems or post-LTE 5G/NR (next generation radio) systems.

When a base station schedules data corresponding to the eMBB service for a specific UE in a certain transmission time interval (TTI), a situation may occur in which the base station needs to transmit URLLC data corresponding to the URLLC service during the TTI. In this case, the base station may transmit the URLLC data without transmitting a part of the eMBB data in a frequency band in which the eMBB data is already scheduled and transmitted. A UE for which the eMBB data is scheduled may be identical to or different from a UE for which the URLLC data is scheduled. In this case, because some of the eMBB data that has already been scheduled and transmitted may not be transmitted, the eMBB data is more likely to be damaged. Thus, in the above-described case, a method for processing signals received by the UE scheduled for eMBB data or UE scheduled for URLLC data and a method for receiving signals need to be determined.

Hereinafter, a base station is an entity that allocates resources to a terminal, and may be at least one of an eNode B, a Node B, a base station (or BS), a wireless access unit, a base station controller, or a network node. In the disclosure, a downlink (or DL) refers to a radio transmission path via which a base station transmits a signal to a UE, and an uplink (or UL) refers to a radio transmission path via which the UE transmits a signal to the base station. Although embodiments of the disclosure are hereinafter described as an example of an LTE or LTE-A system, the embodiments of the disclosure may be applied to other communication systems having similar technical backgrounds and channel configurations. For example, a 5G mobile communication technology (5G or NR) developed after LTE-A may be included in the other communication systems. Furthermore, it should be understood by those skilled in the art that the embodiments of the disclosure are applicable to other communication systems through modifications not departing from the scope of the disclosure.

As a representative example of the broadband wireless communication system, an NR system adopts orthogonal frequency division multiplexing (OFDM) scheme for a downlink while employing both the OFDM scheme and a single carrier frequency division multiple access (SC-FDMA) scheme for an uplink. The uplink refers to a radio link through which a UE (or terminal) or a MS transmits data or a control signal to a base station (or eNode B), and the downlink refers to a radio link through which the base station transmits data or a control signal to the UE. In the multiple access scheme as described above, data or control information of each user may be distinguished by allocating and operating time-frequency resources carrying the data or the control information for each user to prevent overlapping i.e., maintain orthogonality therebetween.

The LTE system adopts a hybrid automatic repeat request (HARQ) method by which data is retransmitted in a physical layer when decoding of the data fails in an initial transmission. According to the hybrid automatic repeat request (HARQ) method, when a receiver fails to correctly decode data, the receiver transmits a negative acknowledgement (NACK) indicating the decoding failure to a transmitter so that the transmitter may retransmit the corresponding data in the physical layer. The receiver may combine the data retransmitted by the transmitter with the data for which the decoding has failed to improve data reception performance. In addition, when the receiver succeeds in correctly decoding the data, the receiver may transmit an ACK indicating the decoding success to the transmitter so that the transmitter may transmit new data.

FIG. 1 illustrates a downlink or uplink time-frequency domain transmission structure in an NR system according to an embodiment of the disclosure. In detail, FIG. 1 is a diagram for explaining a basic structure of a time-frequency domain that is a radio resource region for transmitting the data or control channel in an uplink/downlink of an NR system or a similar system.

Referring to FIG. 1, the abscissa represents a time domain and the ordinate represents a frequency domain. The smallest transmission unit in the time domain is an OFDM or discrete Fourier transform-spread OFDM (DFT-s-OFDM) symbol, the number of $N_{symb}$ OFDM or DFT-s-OFDM symbols 101 may be collected to form a slot 102. Here, an OFDM symbol may be a symbol used for transmitting and receiving a signal according to an OFDM multiplexing scheme, and a DFT-s-OFDM symbol may be a symbol for transmitting and receiving a signal according to a DFT-s-OFDM or SC-FDMA multiplexing scheme. Hereinafter, for convenience of description, an OFDM symbol will be commonly used without distinguishing between OFDM and DFT-s-OFDM symbols, and embodiments of the disclosure will be described with respect to transmission and reception of a downlink signal. However, it will be fully understood by those of ordinary skill in the art that the embodiments may also be applied to transmission and reception of an uplink signal.

For a subcarrier spacing of 15 kHz, one slot may constitute a subframe 103, and the slot and the subframe 103 may each be 1 ms long. In this case, the number of slots in the subframe 103 and a slot length may vary depending on a subcarrier spacing. For example, when the subcarrier spacing is 30 kHz, two slots may form the subframe 103. In this case, a slot length may be 0.5 ms, and a subframe length may be 1 ms.

A radio frame 104 may be a time domain interval consisting of 10 subframes. The smallest transmission unit in the frequency domain is a subcarrier, and the entire system transmission bandwidth may be composed of a total of $N_{sc}^{BW}$ subcarriers 105. However, these specific values may be applied variably according to a system. For example, in an LTE system, a subcarrier spacing is 15 kHz, but the subframe 103 with a length of 1 ms may consist of two slots that are each 0.5 ms long.

The smallest resource unit in the time-frequency domain is a resource element (RE) 106 that may be represented by an OFDM symbol index and a subcarrier index. A resource block (RB) 107 (or physical resource block (PRB)) may be defined as $N_{symb}$ consecutive OFDM symbols 101 in the time domain and $N_{SC}^{RB}$ consecutive sub-carriers 108 in the frequency domain. Thus, the RB 107 in each slot may consist of $N_{symb} \times N_{SC}^{RB}$ REs. In general, the RB 107 may be a minimum data allocation unit in the frequency domain. In an NR system, generally, $N_{symb}=14$ and $N_{SC}^{RB}=12$, and the number of RB's $N_{RB}$ may vary depending on the system transmission bandwidth. In the LTE system, generally, $N_{symb}=7$ and $N_{SC}^{RB}=12$, and the number of RB's $N_{RB}$ may vary depending on the system transmission bandwidth.

DCI may be transmitted within first N OFDM symbols in the subframe 103. In general, N may be {1, 2, 3}, and the UE may be configured with the number of symbols in which the DCI may be transmitted via a higher layer signal from the base station. Furthermore, according to the amount of control information to be transmitted in a current slot, the base station may vary, for each slot, the number of symbols with which DCI may be transmitted in the slot, and may transmit information about the number of symbols to the UE via a separate downlink control channel.

In the NR or LTE system, scheduling information for downlink data or uplink data may be transmitted from the base station to the UE via DCI. Various DCI formats may be defined. For example, each DCI format may represent whether DCI is scheduling information (UL grant) for uplink data or scheduling information (DL grant) for downlink data, whether the DCI is compact DCI having a small size of control information, whether control information is fallback DCI, whether the DCI applies spatial multiplexing using multiple antennas, whether the DCI is DCI for power control, etc. For example, DCI format 1 that is scheduling control information (DL grant) for downlink data (e.g., DCI format 1_0 in NR) may include at least one of the following pieces of control information.

DCI format identifier: An identifier that differentiates a format of received DCI.

Frequency domain resource assignment: This indicates an RB assigned for data transmission.

Time domain resource assignment: This indicates a slot and symbols assigned for data transmission.

VRB-to-PRB mapping: This indicates whether to apply a virtual resource block (VRB) mapping scheme.

Modulation and coding scheme (MCS): This indicates a modulation scheme used for data transmission and a size of a transport block that is data to be transmitted.

New data indicator: This indicates either HARQ initial transmission or retransmission.

Redundancy version: This indicates a redundancy version of HARQ.

HARQ process number: This indicates the number of HARQ processes.

PDSCH assignment information (downlink assignment index): This is transmitted to the UE and indicates the number of PDSCH reception results (e.g., the number of HARQ-ACKs) to be reported to the base station.

Transmit power control (TPC) command for a physical uplink control channel (PUCCH): This indicates a TPC command for a PUCCH that is an uplink control channel.

PUCCH resource indicator: This indicates a PUCCH resource used for reporting a HARQ-ACK including a reception result for a corresponding PDSCH indicated by the DCI.

PUCCH transmission timing indicator (PDSCH-to-HARQ_feedback timing indicator): This indicates information about a slot or symbols in which the UE should transmit a PUCCH for reporting a HARQ-ACK including a reception result for a PDSCH indicated by corresponding DCI.

The DCI may undergo channel coding and modulation and then be transmitted on a PDCCH that is a physical downlink control channel (hereinafter to be used interchangeably with control information) or an enhanced PDCCH (EPDCCH) (hereinafter to be used interchangeably with enhanced control information).

In general, the DCI may be independently attached with a cyclic redundant check (CRC) scrambled with a specific radio network temporary identifier (RNTI) (or Cell RNTI (C-RNTI) that is a UE identifier) for each UE, undergo channel coding, and then be configured as an independent PDCCH for transmission. In the time domain, the PDCCH may be mapped and transmitted during a control channel transmission interval. A location where the PDCCH is mapped in the frequency domain may be determined by an ID of each UE, and the PDCCH to be transmitted may be spread over the entire system transmission bandwidth.

Downlink data may be transmitted on a PDSCH that is a physical channel for transmission of downlink data. The PDSCH may be transmitted after the control channel transmission interval, and scheduling information such as a specific mapping location in the frequency domain, a modulation scheme, etc. may be determined based on a DCI transmitted through the PDCCH.

By using MCS in control information constituting the DCI, the base station may notify the UE about a modulation scheme applied to a PDSCH to be transmitted to the UE and a size of data to be transmitted (transport block size (TBS)). According to an embodiment of the disclosure, the MCS may consist of five (5) bits or more or fewer bits. The TBS may correspond to a size of a transport block (TB) before channel coding for error correction is applied to data (TB) to be transmitted by the BS.

Modulation schemes supported in the NR system are quadrature phase shift keying (QPSK), 16 quadrature amplitude modulation (QAM), 64QAM, and 256QAM for which the modulation orders Qm correspond to 2, 4, 6, and 8, respectively. That is, in QPSK modulation, 2 bits per symbol may be transmitted, while in 16QAM, 64QAM and 256QAM modulation schemes, 4, 6, and 8 bits per symbol may be transmitted, respectively. Furthermore, higher order modulation schemes than 256QAM may be used depending on system variations.

The NR system adopts an asynchronous HARQ scheme in uplink/downlink, by which data retransmission does not occur at a fixed time. For example, in the downlink, when the base station receives, from the UE, a HARQ NACK feedback for its initial transmission data, the base station may freely determine the time of transmission of retransmission data according to a scheduling operation. The UE may decode the received data for a HARQ operation, buffer data determined as an error after the decoding, and combine the buffer with data retransmitted from the base station. HARQ ACK/NACK information for a PDSCH transmitted in a subframe n-k may be transmitted from the UE to the base station via a PUCCH or PUSCH in subframe n. In a 5G communication system such as an NR system, the value of k may be transmitted in a DCI indicating or scheduling reception of a PDSCH transmitted in subframe n-k, or may be configured to the UE via a higher layer signal. In this case, the base station may configure one or more values of k via a higher layer signal or may indicate a specific value of k via the DCI. In this case, the value of k may be determined according to HARQ-ACK processing capability of the UE, i.e., the minimum time required for the UE to receive a PDSCH and generate and report an HARQ-ACK for reception of the PDSCH. Furthermore, the UE may use a previously defined value or a default value until being configured with the value of k.

Hereinafter, the description of the above-described the following description may be based on an NR system in order to describe the wireless communication system and a method and apparatus proposed in embodiments of the disclosure, but embodiments of the disclosure are not limited to the NR system but may be applied to various wireless communication systems such as LTE, LTE-A, LTE-A-Pro, and 5G systems. Furthermore, while embodiments of the disclosure have been described with respect to a system and apparatus for transmitting and receiving a signal by using an unlicensed band, the embodiments are also applicable to a system operating in a licensed spectrum.

Hereinafter, in the disclosure, higher layer signaling or transmission via a higher layer signal may be a signal transmission method in which a signal is transmitted from a base station to a UE via a physical layer downlink data channel or from a UE to a base station via a physical layer uplink data channel, and may include radio resource control (RRC) signaling, packet data convergence protocol (PDCP) signaling, or a signal transmission method using a media access control element (MAC CE). Furthermore, the higher layer signaling or higher layer signal may include system information, transmitted commonly to a plurality of UEs, such as system information blocks (SIBs).

In a system for performing communication over an unlicensed band, a transmitting device (base station or UE) that wants to transmit a signal in an unlicensed band may perform a channel access procedure (or LBT) on the unlicensed band in which the communication is to be performed before transmitting the signal. When the unlicensed band is determined to be in an idle state as a result of a channel access procedure, the transmitting device may access the unlicensed band to perform signal transmission. Otherwise, when the unlicensed band is not determined to be in the idle state as a result of the channel access procedure, the transmitting device may not perform the signal transmission.

In a channel access procedure on an unlicensed band, a transmitting device may generally measure a strength of a signal received via the unlicensed band for a fixed time duration or for a time duration calculated according to a predefined rule (e.g., a time duration calculated through at least one random value selected by the base station or UE). The transmitting device may determine whether the unlicensed band is in an idle state by comparing the strength of the received signal with a threshold predefined or calculated using a function that consists of at least one parameter from among a channel bandwidth, a bandwidth over which a signal to be transmitted is transmitted, and a strength of a transmit power and determines the strength of the received signal.

For example, the transmitting device may measure a strength of a signal for a duration of X us (e.g., 25 μs) immediately before transmitting the signal. When the measured strength of the signal is less than a predefined or calculated threshold T (e.g., −72 dBm), the transmitting device may determine that the unlicensed band is in an idle state and transmit the signal. In this case, a maximum time available for continuous signal transmission after the channel access procedure may be limited by the MCOT in each unlicensed band defined for each country, geographical region, or frequency band, or by a type of the transmitting device (e.g., the base station or UE, or a master device or slave device). For example, in Japan, when a base station or UE performs a channel access procedure over the unlicensed 5 GHz spectrum to determine that the unlicensed band is in an idle state, the base station or UE may transmit a signal by occupying a corresponding channel for a maximum of 4 ms without performing an additional channel access procedure.

In detail, when a base station or UE wants to transmit a downlink or uplink signal in an unlicensed band, a channel access procedure that can be performed by the base station or UE may be classified into the following three types:

Type 1: transmission of an uplink/downlink signal after performing the channel access procedure for a variable time duration.

Type 2: transmission of an uplink/downlink signal after performing the channel access procedure for a fixed time duration.

Type 3: transmission of an uplink/downlink signal without performing the channel access procedure.

Hereinafter, in the disclosure, both a case where a base station transmits a downlink signal to a UE via an unlicensed band and a case where the UE transmits an uplink signal to the base station via the unlicensed band will be described. However, embodiments of the disclosure may be applied in the same way to or may be applied with some modifications to a case in which the UE transmits an uplink signal to the base station through the unlicensed band and a case in which the base station transmits a downlink signal to the UE through the unlicensed band. Thus, descriptions with respect to transmission and reception of a downlink signal are omitted herein. Furthermore, it is hereinafter assumed that the base station and the UE transmit and receive one piece of downlink data (codeword or TB) or one uplink data packet therebetween. However, embodiments of the disclosure may also be applied when the base station transmits a downlink signal to a plurality of UEs or when the base station and the UE transmit and receive a plurality of codewords or TBs therebetween.

A transmitter node (a base station or UE) that wants to transmit a signal in an unlicensed band may determine the type of a channel access procedure according to a type of the signal to be transmitted. For example, when the base station wants to transmit a downlink signal including a downlink data channel as an unlicensed band, it may perform a Type 1 channel access procedure. On the other hand, when the base station wants to transmit a downlink signal that does not include a downlink data channel as the unlicensed band, e.g., by transmitting a synchronization signal or downlink control channel, the base station may perform a Type 2 channel access procedure and transmit the downlink signal.

In this case, the base station may also determine the type of a channel access procedure according to a transmission length of a signal to be transmitted in an unlicensed band and a length of time or an interval during which the base station occupies and uses the unlicensed band. In general, the Type 1 channel access procedure may need to be performed for a longer time than the Type 2 channel access procedure. Thus, when the base station wants to transmit a signal for a short time interval or a time period less than a reference time (e.g., X ms or Y symbols), the base station may perform the Type 2 channel access procedure. On the other hand, when the base station wants to transmit a signal for a long time interval or a time period greater than or equal to the reference time (e.g., X ms or Y symbols), it may perform the Type 1 channel access procedure. In other words, the base station may perform different types of channel access procedures depending on a time period during which the base station makes use of the unlicensed band.

When performing the Type 1 channel access procedure based on at least one of the above-described criteria, the base station may determine a channel access priority class according to a quality-of-service class identifier (QCI) value of a signal to be transmitted in the unlicensed band and perform a channel access procedure by using at least one of setting values predefined for the determined channel access priority class as shown in Table 1. For example, QCIs 1, 2, and 4 may respectively indicate QCI values for services such as conversational voice, conversational video (live streaming), and non-conversational video (buffered streaming). When the base station wants to transmit in the unlicensed band a signal for a service that does not match a QCI value in Table 1, it may select a QCI value closest to the service from among QCI values in Table 1 and a channel access priority class for the selected QCI value.

Table 1 shows a mapping relationship between channel access priority classes and QCIs.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, referring to Table 2 below, the base station may determine, according to the determined channel access priority class p, a defer duration, a set of a contention window values or sizes CW_p, a minimum contention window value CW_min, p and a maximum contention window value CW_max, p, and a maximum available channel occupancy time T_mcot,p. In other words, the base station that wants to transmit a downlink signal in the unlicensed band may perform a channel access procedure over the unlicensed band for at least a time duration equal to T_f+m_p*T_sl (212).

When a channel access procedure is to be performed using a channel access priority class 3 (p=3), a length of defer duration T_f+m_p*T_sl needed to perform the channel access procedure may be set by using m_p=3. When it is determined that the unlicensed band is in an idle state during all the sot durations of m_p*T_sl, N=N−1. In this case, N may be a random integer value selected from among values between 0 and a contention window value CW_p at a time point when the channel access procedure is performed. Referring to Table 2, when a channel access priority class is 3, a minimum contention window value and a maximum contention window value are 15 and 63, respectively. When it is determined that the unlicensed band is in an idle state during the defer duration and during an additional time period of channel access procedure, the base station may transmit a signal via the unlicensed band for a maximum time T_mcot,p (8 ms).

Table 2 shows channel access priority classes for a downlink. For convenience of description, the disclosure will be described based on channel access priority classes for a downlink. However, for an uplink, the channel access priority classes shown in Table 2 may be reused, or channel access priority classes may be separately defined for the uplink and used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p may be a minimum contention window value CW_min,p. After selecting the value of N, the base station may perform a channel access procedure for a slot duration T_sl (220). When the unlicensed band is determined to be in an idle state as a result of performing the channel access procedure for the duration T_sl, the base station may change the value of N to N−1, and when N=0, the base station may transmit a signal for the maximum time T_mcot,p. Otherwise, when the unlicensed band is not determined to be in the idle state as a result of performing the channel access procedure for the slot duration T_sl, the base station may not change the value of N but perform again the channel access procedure.

The contention window value CW_p may be changed based on a reception result for a downlink data channel in a reference subframe or a reference slot of a transmission period (or MCOT) when a downlink data signal was most recently transmitted by the base station via the unlicensed band at or immediately before a time point when the base station initiates the channel access procedure or at or immediately before a time point when the base station selects the value of N to perform the channel access procedure. In other words, the base station may receive, from the UE, a report of a reception result for downlink data transmitted in the reference subframe or the reference slot, and may increase or minimize the contention window size CW_p according to a ratio (Z) of the reported reception results determined as NACK.

Figure 2:
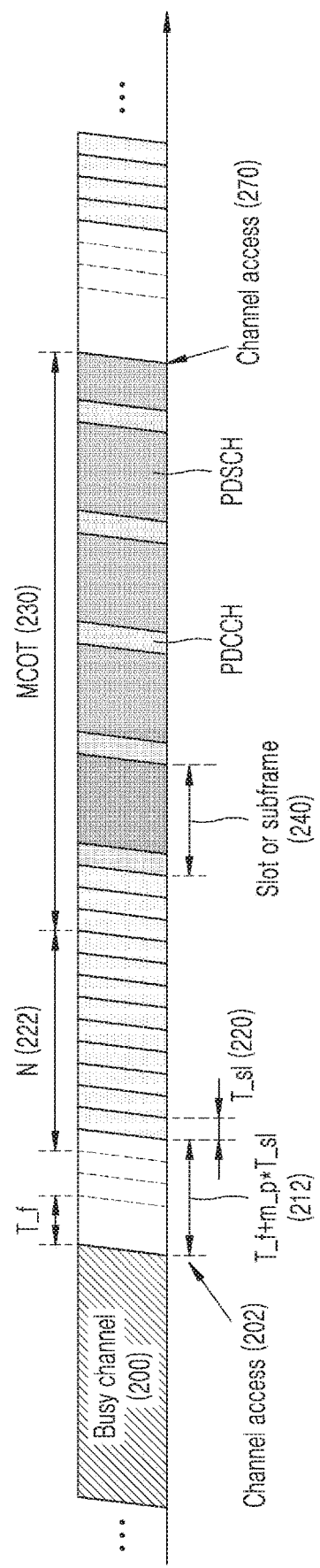
FIG. 2 illustrates a channel access procedure in an unlicensed band according to an embodiment of the disclosure.

FIG. 2 illustrates a channel access procedure in an unlicensed band according to an embodiment of the disclosure.

Referring to FIG. 2, for example, a reference slot for changing a contention window value necessary for performing the channel access procedure may be a first transmission interval 240 (hereinafter, referred to as a first slot or subframe) in a transmission period 230 when a downlink signal has been most recently transmitted via an unlicensed band at or immediately before a time point 270 when the base station initiates a channel access procedure or at or immediately before a time point when the base station selects the value of N (222) to perform the channel access procedure, In a case where the base station fails to receive a report of a reception result for a downlink data channel transmitted in the first slot or subframe 240 of the transmission period 230, a first subframe of a period of a most recent downlink signal transmission made before the transmission period 230 may be the reference subframe. For example, the case may be where a time interval between the first slot or subframe and the time point 270 when the base station initiates the channel access procedure is less than n slots or n subframes, i.e., where the base station initiates the channel access procedure before the time when the UE can report the reception result for the downlink data channel transmitted in the first slot or subframe. In other words, when the base station fails to receive, from the UE, a reception result for downlink data transmitted in the first slot or subframe 240, i.e., the reference slot or subframe, at or immediately before the time point 270 when the base station initiates the channel access procedure or at or immediately before the time point when the base station selects the value of N to perform the channel access procedure, the base station may determine, as the reference frame, a first subframe of a transmission period of a most recently transmitted downlink signal for which a reception result has been received from among reception results with respect to a downlink data channel previously received from UEs. Then, the base station may determine a contention window size (CW_p) value used in the channel access procedure by using downlink data reception results received from the UEs with respect to downlink data transmitted via the downlink data channel in the reference subframe.

For example, the base station may transmit a downlink signal after a channel access procedure (e.g., CW_p=15) configured according to a channel access priority class 3 (p=3). In this case, when at least 80% of the reception results for downlink data transmitted to the UE via the downlink data channel in the first slot or subframe are determined as NACK, from among downlink signals transmitted in the unlicensed band, the base station may increase the contention window size CW_p from an initial value (CW_p=15) to a next contention window size (CW_p=31).

Otherwise, when less than 80% of the reception results received from the UE are determined as NACK, the base station may maintain the contention window size CW_p as a current value or change it to an initial contention window value. In this case, a change in the contention window size CW_p may be commonly applied to all of the channel access priority classes or may be applied to only a channel access priority class used in the channel access procedure. In this regard, a method of determining a Z value, in detail, a method of determining a reception result that is effective in determining whether to change the contention window size CW_p may be provided as follows, wherein the reception result is from among downlink data reception results transmitted and reported to the base station by the UE with respect to downlink data that was transmitted via a downlink data channel in a reference subframe or a reference slot for determining a change of the contention window size CW_p.

When the base station transmits one or more codewords or TBs to one or more UEs in the reference subframe or the reference slot, the base station may determine the Z value as a ratio of NACKs among reception results transmitted or reported by the one or more UEs with respect to the TBs received in the reference subframe or the reference slot. For example, when two codewords or two TBs are transmitted to the UE in the reference subframe or the reference slot, the base station may receive, from the UE, a transmission or report of downlink data signal reception results for the two codewords or TBs. When a ratio of NACKs (Z) in the two reception results is greater than or equal to a threshold value (e.g., Z=80%) predefined or set between the base station and the UE, the base station may change or increase the contention window size CW_p.

When the UE performs bundling on downlink data reception results across one or more subframes (e.g., M subframes) including the reference subframe or the reference slot and transmits or reports a result of the bundling to the base station, the base station may determine that the UE has transmitted M reception results. Then, the base station may determine a ratio of NACKs among the M reception results as a Z value, and may change, maintain, or initialize the contention window size CW_p.

When the reference subframe corresponds to a reception result for a second slot of two slots within the subframe, the base station may determine the Z value based on a ratio of NACKs among reception results which the UE has transmitted or reported to the BS with respect to downlink data received in the reference subframe (in other words, the second slot) and a next subframe.

Furthermore, scheduling information or DCI for a downlink data channel to be transmitted by the base station may be transmitted in a cell or a frequency band which is the same as a cell or a frequency band in which the downlink data channel is transmitted, or the scheduling information or the DCI may be transmitted in an unlicensed band but and in a cell or a frequency band which is different from the cell or the frequency band in which the downlink data channel is transmitted. In this case, when the UE is determined not to have transmitted a reception result for downlink data received in the reference subframe or slot or when a reception result for the downlink data, transmitted by the UE, is determined as DTX, NACK/DTX, or any state, the base station may determine the reception result from the UE to be NACK and thus obtain the Z value.

Furthermore, in a case where the scheduling information or the DCI for the downlink data channel to be transmitted by the base station is transmitted in a licensed spectrum, when a reception result for downlink data, which is transmitted by the UE, is determined as DTX, NACK/DTX, or any state, the base station may not include the reception result from the UE in the Z value that is used as a reference in determining a change of the contention window size CW_p. In other words, the base station may ignore the reception result from the UE and determine the Z value.

Furthermore, in a case where the base station transmits the scheduling information or the DCI for the downlink data channel in the licensed spectrum, when the base station actually does not transmit downlink data (no transmission), the base station may ignore a reception result for downlink data in the reference subframe or reference slot, which the UE transmitted or reported to the base station, and may determine the Z value.

In a 5G system, it is necessary to flexibly define and operate a frame structure by taking into account various services and requirements. For example, each service may be considered to have a different subcarrier spacing according to the requirements. A method of supporting a plurality of subcarrier spacings in a current 5G communication system may be determined by using Equation 1 below.

$$\Delta f = f_0 2^m \qquad \text{Equation 1}$$

where $f_0$ may be a default subcarrier spacing of a system, and m may represent a scaling factor that is an integer. For example, when $f_0$ is 15 kHz, a set of subcarrier spacings that can be supported by the 5G communication system may be composed of 3.75 kHz, 7.5 kHz, 15 kHz, 30 kHz, 60 kHz, 120 kHz, 240 kHz, and 480 kHz. In an embodiment of the disclosure, an available set of subcarrier spacings may vary according to frequency bands. For example, in a frequency band equal to or less than 6 GHz, 3.75 kHz, 7.5 kHz, 15 kHz, 30 kHz, and 60 kHz may be used, and in a frequency band equal to or greater than 6 GHz, 60 kHz, 120 kHz, and 240 kHz may be used.

A length of an OFDM symbol may vary according to a spacing between subcarriers constituting the OFDM symbol. This is because the spacing between subcarriers has an inverse relationship to the length of the OFDM symbol due to characteristics of the OFDM symbol. For example, when the subcarrier spacing is increased by twice, the length of the OFDM symbol may be decreased by half, and inversely, when the subcarrier spacing is decreased by half, the length of the OFDM symbol may be increased by twice.

Next, a resource region where a data channel is transmitted in a 5G communication system will be described.

Figure 3:
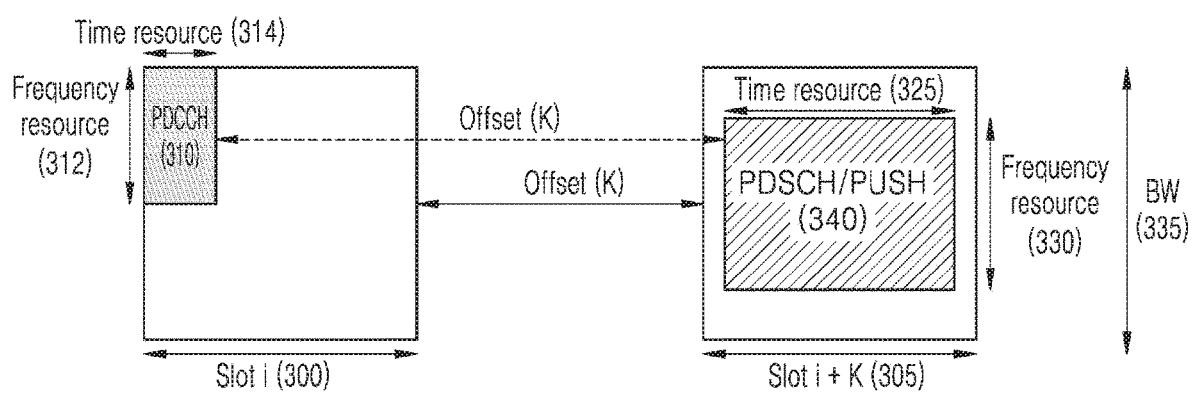
FIG. 3 illustrates a resource region in which a data channel is transmitted in an NR or 5G communication system, according to an embodiment of the disclosure.

FIG. 3 illustrates a resource region in which a data channel is transmitted in a 5G communication system according to an embodiment of the disclosure. In detail, FIG. 3 illustrates a downlink or uplink scheduling method and a resource region in an NR or 5G communication system, according to an embodiment of the disclosure.

Referring to FIG. 3, a UE may monitor or detect for a PDCCH 310 in a PDCCH area (hereinafter, referred to as a control resource set (CORESET) or a search space (or SS) configured via a higher layer signal from the base station. In this regard, the PDCCH area (or CORESET) is composed of time domain information 314 and frequency domain information 312 Furthermore, the time domain information 314 may be configured in units of symbols, and the frequency domain information 312 may be configured in units of RBs or RB groups. When the UE detects the PDCCH 310 in a slot i 300, the UE may obtain DCI transmitted via the detected PDCCH 310. The UE may obtain, via the received DCI, scheduling information about a downlink data channel or an uplink data channel. In other words, the DCI may include at least one of information about a resource region (or a PDSCH transmission region) in which the UE needs to receive a downlink data channel transmitted from the base station (BS) (hereinafter, referred to as a PDSCH), or information about a resource region that is allocated to the UE by the base station for transmission of an uplink data channel (i.e., a PUSCH).

An example in which the UE is scheduled to transmit an uplink data channel (i.e., a PUSCH) according to an embodiment of the disclosure is now described. The UE that received DCI may obtain, via the DCI, a slot index in which the UE is to receive PUSCH or offset information K, and may determine a PUSCH transmission slot index. Referring to FIG. 3, for example, the UE may determine that the UE is scheduled to transmit a PUSCH in a slot i+K 305 derived based on the received offset information K and a slot index i 300 in which the PDCCH 310 was received. In this case, the UE may also determine the slot i+K 305 or a start symbol or time in the slot i+K 305 in which the PUSCH will be transmitted, based on the offset information K derived from a CORESET where the PDCCH 310 was received. Furthermore, the UE may obtain, via the DCI, information about a PUSCH transmission time-frequency resource region 340 in the slot i+K 305 that is a PUSCH transmission slot. In this case, PUSCH transmission frequency resource region information 330 may include information configured in units of physical RBs (PRB) or PRB groups.

The PUSCH transmission frequency resource region information 330 may be a region included in an initial uplink bandwidth (BW) 335 or initial uplink bandwidth part (BWP) that is determined by or is configured for the UE via an initial access procedure. When the UE is configured with an uplink BW or uplink BWP via a higher layer signal, the PUSCH transmission frequency resource region information 330 may be a region included in the uplink BW or uplink BWP configured via the higher layer signal.

PUSCH transmission time resource region information 325 may be information expressed in units of symbols or symbol groups or information indicating absolute time information. In this case, the PUSCH transmission time resource region information 325 may be expressed as at least one of a PUSCH transmission starting time or symbol, a PUSCH transmission length, a PUSCH transmission end time or symbol, or a combination thereof and may be included in DCI as one field or one value. In this regard, the PUSCH transmission time resource region information 325 may be included, in the DCI, as fields or values respectively representing the PUSCH transmission start time or symbol, a PUSCH transmission length, and the PUSCH transmission end time or symbol. The UE may transmit the PUSCH in a PUSCH transmission resource region 340 determined via the DCI.

Hereinafter, a downlink control channel in an NR or 5G communication system will be described in more detail with reference to FIG. 4.

Figure 4:
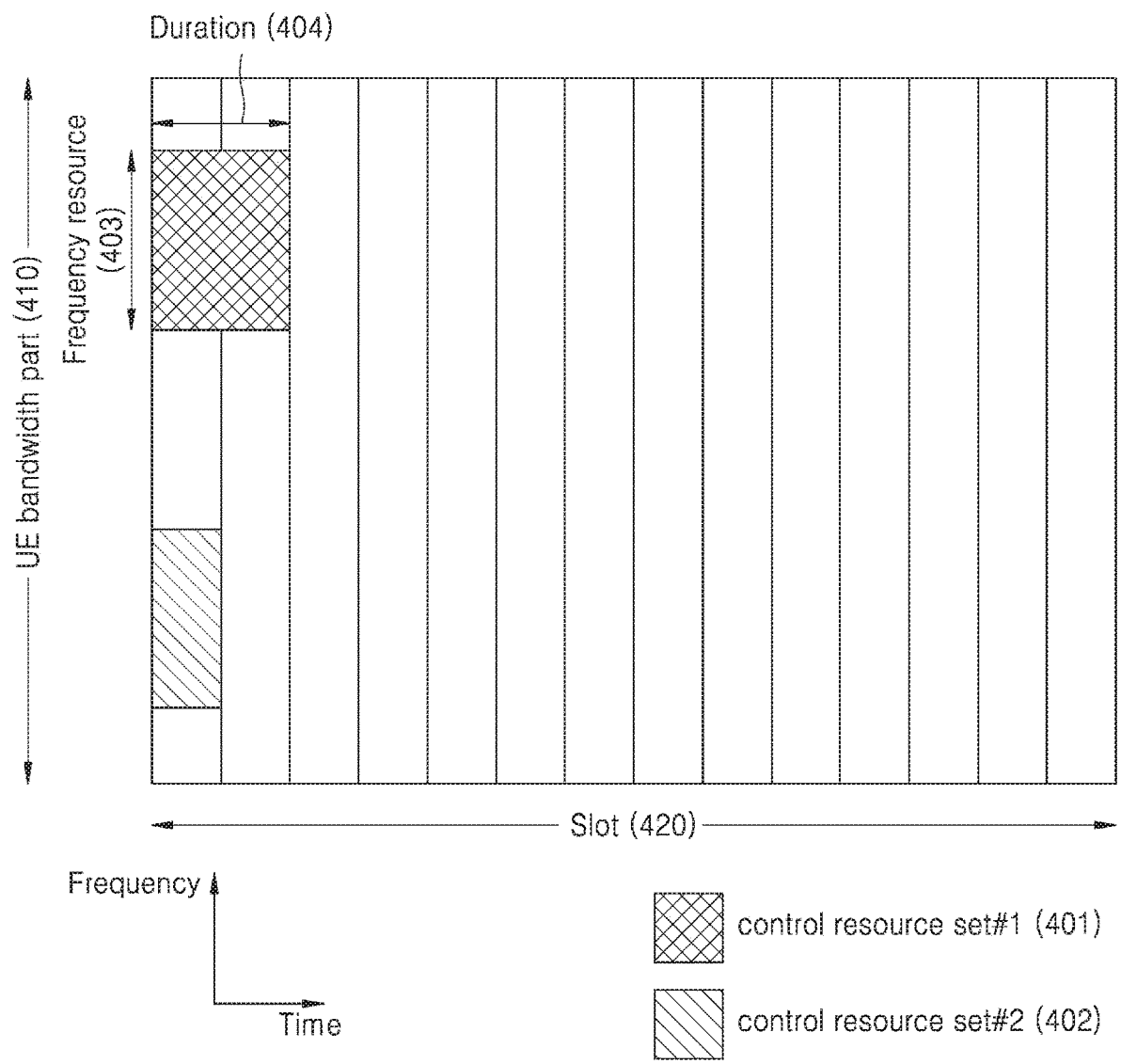
FIG. 4 is a diagram for explaining a configuration of a control resource set (CORESET) for a downlink control channel in an NR or 5G communication system, according to an embodiment of the disclosure.

FIG. 4 is a diagram for explaining an example of a CORESET in which a downlink control channel is transmitted in an NR or 5G communication system, according to an embodiment of the disclosure.

Referring to FIG. 4, two CORESETs CORESET #1 401 and CORESET #2 402 are configured in a BWP 410 of a UE on a frequency axis and in one slot 420 on a time axis.

The CORESETs 401 and 402 may be configured in a specific frequency resource within the whole UE's BWP 410 on the frequency axis. The CORESETs 401 and 402 may be configured as one or a plurality of OFDM symbols, which may be defined as a CORESET duration (404). In FIG. 4, for example, the CORESET #1 401 is configured with a CORE-SET length of 2 symbols, and the CORESET #2 402 is configured with a CORESET length of 1 symbol.

A CORESET in 5G may be configured via higher layer signaling (e.g., system information, a master information block (MIB), or RRC signaling) provided by the base station to the UE. Configuring a CORESET for the UE may mean providing information such as a CORESET identity, a frequency location 403 of the CORESET, and a symbol length of the CORESET. For example, configuration of a CORESET may include the information listed in Table 3.

TABLE 3

| | |
|---|---|
| ControlResourceSet ::= | SEQUENCE { |
| -- Corresponds to L1 parameter 'CORESET-ID' | |
| controlResourceSetId | ControlResourceSetId, |
| (CORESET Identity) | |
| frequencyDomainResources | BIT STRING (SIZE (45)), |
| (Frequency Domain Allocation Information) | |
| duration | INTEGER (1..maxCoReSetDuration), |
| (Time Domain Allocation Information) | |
| cce-REG-MappingType | CHOICE { |
| (CCE-to-REG Mapping Type) | |
| interleaved | SEQUENCE { |
| reg-BundleSize | ENUMERATED (n2, n3, n6), |
| (REG BundleSize) | |
| precoderGranularity | ENUMERATED (sameAsREG- |
| bundle, allContiguousRBs), | |
| interleaverSize | ENUMERATED {n2, n3, n6} |
| ( Interleaver Size) | |
| shiftIndex | |
| INTEGER(0..maxNrofPhysicalResourceBlocks-1) | |
| ( Interleaver Shift) | |
| }, | |
| nonInterleaved | NULL |
| }, | |
| tci-StatesPDCCH | SEQUENCE (SIZE (1..maxNrofTCI- |
| StatesPDCCH)) OF TCI-StateId | OPTIONAL, |
| (QCL (Quasi Co-Location) Configuration Information) | |
| tci-PresentInDCI | ENUMERATED (enabled) |
| } | |

In the above Table 3, tci-StatesPDCCH (hereinafter referred to as a TCI state) configuration information may include information of one or a plurality of synchronization signal (SS)/PBCH block indices or CSI-RS indices that have a Quasi Co Location (QCL) relationship with a demodulation reference signal (DMRS) transmitted in a corresponding CORESET. Furthermore, frequencyDomainResources configuration information may configure a frequency resource of a corresponding CORESET through a bitmap. Here, each bit may indicate a group of 6 PRBs that do not overlap. A first group may mean a 6 PRB group having a first PRB index as $6 \cdot \lceil N_{BWP}^{start}/6 \rceil$ where $N_{BWP}^{start}$ represents a starting location of a BWP. A first bit (also referred to as a most significant bit (MSB)) in the bitmap may indicate the first group and may be set in the ascending order.

Figure 5:
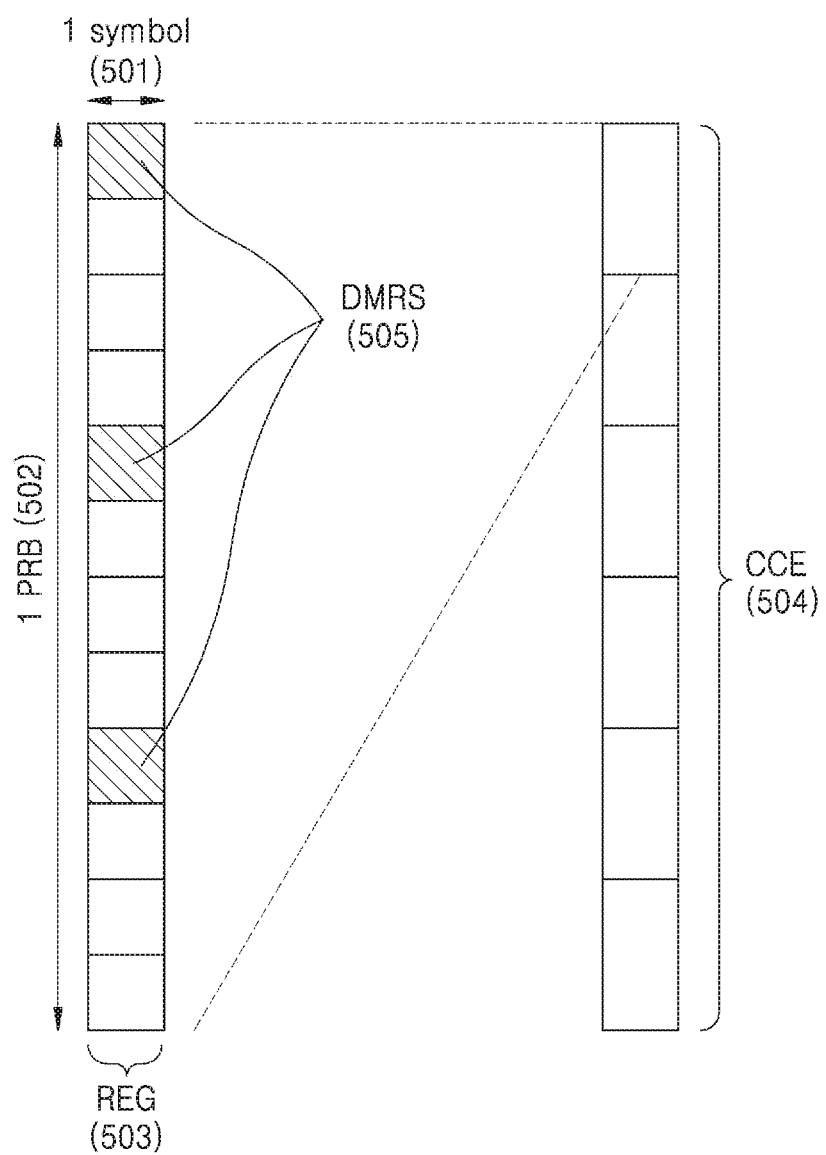
FIG. 5 illustrates a structure of a downlink control channel in an NR or 5G communication system, according to an embodiment of the disclosure.

FIG. 5 is a diagram illustrating an example of a basic unit of time and frequency resources constituting a downlink control channel that may be used in an NR or 5G communication system, according to an embodiment of the disclosure.

Referring to FIG. 5, a basic unit of time and frequency resources constituting a control channel may be referred to as a resource element group (REG) 503, and the REG 503 may be defined as 1 OFDM symbol 501 on the time axis and 1 physical resource block (PRB) 502 on the frequency axis, that is, 12 subcarriers. The REG 503 may consist of a group of consecutive REs that constitute a downlink control channel allocation unit.

Referring to FIG. 5, when a basic unit in which a downlink control channel is allocated in 5G is called a control channel element (CCE), each CCE 504 may consist of a plurality of REGs 503. The REG 503 shown in FIG. 5 is described as an example. When the REG 503 is made up of 12 REs and the CCE 504 consists of 6 REGs 503, the CCE 504 may consist of 72 REs. As a CORESET is configured, the CORESET may consist of a plurality of CCEs 504, and a specific downlink control channel may be transmitted by being mapped to one or a plurality of CCEs 504 in the CORESET according to an aggregation level (AL). The CCEs 504 in the CORESET may be distinguished by numbers that may be assigned according to a logical mapping scheme.

The basic unit of the downlink control channel shown in FIG. 5, i.e., REG 503, may include all REs to which DCI is mapped and a region to which a DMRS 505, which is a reference signal for decoding the REs, is mapped. As illustrated in FIG. 5, for example, three DMRSs 505 may be transmitted in one REG 503.

The number of CCEs required to transmit a PDCCH may be 1, 2, 4, 8, or 16 depending on an AL, and a different number of CCEs may be used to implement link adaptation of a downlink control channel. For example, when AL=L, one downlink control channel may be transmitted using L CCEs. The UE is required to detect a signal as it is not aware of information about a downlink control channel, and a search space representing a set of CCEs may be used for blind decoding. The search space is a set of downlink control channel candidates, each being composed of CCEs, intended for the UE to attempt to decode at a given AL. According to an embodiment of the disclosure, because there are various ALs respectively corresponding to sets of 1, 2, 4, 8, and 16 CCEs, the UE may have a plurality of search spaces. A search space set may be defined as a set of search spaces at all configured ALs.

The search space may be classified into a common search space and a UE-specific search space. A particular group of UEs or all UEs may search a PDCCH common search space in order to receive cell-common control information such as dynamic scheduling of system information or paging messages. For example, scheduling allocation information of a PDSCH for transmission of a SIB including cell operator information may be received by searching the PDCCH search space. Because a particular group of UEs or all UEs need to receive a PDCCH, the common search space may be defined as a predetermined set of CCEs. The scheduling allocation information for a UE-specific PDSCH or PUSCH may be received by searching a UE-specific PDCCH search space. The UE-specific search space may be specifically defined for a UE based on the identity of the UE and a function of various system parameters.

In 5G, parameters for a PDCCH search space may be configured for the UE by the base station based on higher layer signaling (e.g., SIB, MIB, RRC signaling). For example, the base station may configure the terminal with the number of PDCCH candidates at each AL L, a monitoring periodicity for a search space, monitoring occasions in symbols within slots for the search space, a search space type (common search space or UE-specific search space), a combination of DCI format and RNTI to be monitored in the search space, and an index of a CORESET in which the search space is to be monitored. For example, the above-described configuration information may include the following pieces of information listed in Table 4.

TABLE 4

```
SearchSpace ::=                    SEQUENCE {
    -- Identity of the search space. SearchSpaceId - 0 identifies the
    SearchSpace configured via PBCH (MIB) or ServingCellConfigCommon.
    searchSpaceID                  SearchSpaceId,
    ( Search Space Identity)
    controlResourceSetId           ControlResourceSetId
    ( CORESET Identity)
    monitoringSlotPeriodicityAndOffset   CHOICE {
    ( Slot Level Monitoring Periodicity)
        sl1                        NULL,
        sl2                        INTEGER (0..1),
        sl4                        INTEGER (0..3),
        sl5                      INTEGER (0..4),
        sl8                        INTEGER (0..7),
        sl10                       INTEGER (0..9),
        sl16                       INTEGER (0..15),
        sl20                       INTEGER (0..19)
    }
    monitoringSymbolsWithinSlot         BIT STRING (SIZE (14))
    ( Monitoring Symbol within Slot)
    nrofCandidates                 SEQUENCE {
    ( Number of PDCCH Candidates Per Aggregation Level)
        aggregationLevel1          ENUMERATED (n0, n1, n2, n3, n4,
    n5, n6, n8),
        aggregationLevel2          ENUMERATED (n0, n1, n2, n3, n4,
    n5, n6, n8),
        aggregationLevel4          ENUMERATED (n0, n1, n2, n3, n4,
    n5, n6, n8),
        aggregationLevel8          ENUMERATED (n0, n1, n2, n3, n4,
    n5, n6, n8),
        aggregationLevel16            ENUMERATED (n0, n1, n2, n3,
    n4, n5, n6, n8)
    },
    searchSpaceType                CHOICE {
    ( Search Space Type)
    -- Configures this search space as common search space (CSS) and
    DCI formats to monitor.
        common                     SEQUENCE {
        ( Common Search Space)
        }
```

TABLE 4-continued

```
ue-Specific                              SEQUENCE {
( UE-Specific Search Space)
  -- Indicates whether the UE monitors in this USB for DCI
formats 0-0 and 1-0 or for formats 0-1 and 1-1.
    formats                              ENUMERATED (formats0-0-And-
1-0, formats0-1-And-1-1),
  ...
}
```

Depending on the configuration information, the base station may configure the UE with one or a plurality of search space sets. For example, the base station may configure the UE with search space set 1 and search space set 2, and may configure the UE to monitor in a common search space a DCI format A scrambled with X-RNTI in the search space set 1 and to monitor in a user-specific search space a DCI format B scrambled with Y-RNTI in the search space set 2.

According to the above-described configuration information, one or a plurality of search space sets may exist in the common search space or the UE-specific search space. For example, search space set #1 and search space set #2 may be configured as a common search space set, and search space set #3 and search space set #4 may be configured as a UE-specific search space set.

The following combinations of DCI formats and RNTIs may be monitored in the common search space.

DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI The following combinations of DCI formats and RNTIs may be monitored in the user-specific search space.

DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The RNTIs specified above may comply with the following definitions and use cases.

C-RNTI (Cell RNTI): for UE-specific PDSCH scheduling
  TC-RNTI (Temporary Cell RNTI): for UE-specific PDSCH scheduling
  CS-RNTI (Configured Scheduling RNTI): for semi-statically configured UE-specific PDSCH scheduling
  RA-RNTI (Random Access RNTI): for PDSCH scheduling in a random access phase
  P-RNTI (Paging RNTI): for scheduling of a PDSCH that carries paging information
  SI-RNTI (System Information RNTI): PDSCH scheduling for transmission of system information
  INT-RNTI (Interruption RNTI): for providing notification about whether to puncture PDSCH
  TPC-PUSCH-RNTI (Transmit Power Control for PUSCH RNTI): for indicating power control command for PUSCH
  TPC-PUCCH-RNTI (Transmit Power Control for PUCCH RNTI): for indicating power control command for PUCCH
  TPC-SRS-RNTI (Transmit Power Control for SRS RNTI): for indicating power control command for SRS In 5G, a plurality of search space sets may be configured with different parameters (for example, DCI format). Therefore, a group of search space sets monitored by the UE may vary at each time point. For example, when search space set #1 is configured with an X-slot period, search space set #2 is configured with a Y-slot period, and X is different from Y, the UE may monitor both the search space set #1 and the search space set #2 in a slot while monitoring one of the search space set #1 and search space set #2 in another slot.

When the UE is configured with a plurality of search space sets, the following conditions may be considered for a method of determining a search space set to be monitored by the UE.

[Condition 1: Limit on the Maximum Number of PDCCH Candidates]

The number of PDCCH candidates that can be monitored per slot may not exceed $M^\mu$. $M^\mu$ may be defined as the maximum number of PDCCH candidates per slot in a cell configured to have a subcarrier spacing of $15 \cdot 2^\mu$ kHz, as shown in Table 5 below.

TABLE 5

| $\mu$ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit on the Maximum Number of CCEs]

The number of CCEs constituting all search spaces per slot may not exceed $C\mu$. Here, all search spaces may mean all CCE sets corresponding to a union region of a plurality of search space sets. $C^\mu$ may be defined as the maximum number of CCEs per slot in a cell configured to have a subcarrier spacing of $15 \cdot 2\mu$ kHz, as shown in Table 6 below.

TABLE 6

| $\mu$ | Maximum number of CCEs per slot and per serving cell ($C^\mu$) |
|---|---|
| 0 | 56 |
| 1 | 56 |
| 2 | 48 |
| 3 | 32 |

For convenience of description, a condition that satisfies both condition 1 and condition 2 at a specific time point is defined as "condition A". Therefore, not satisfying condition A may mean that at least one of condition 1 or condition 2 is not satisfied.

Condition A may not be satisfied at a specific time point according to configuration of search space sets by the base station. When condition A is not satisfied at a specific time point, the UE may select and monitor only some of the search space sets configured to satisfy condition A at the corresponding time point, and the base station may transmit a PDCCH using the selected search space sets.

As a method of selecting some search spaces from among all the configured search space sets, the following methods may be used.

[Method 1]

When condition A for the PDCCH is not satisfied at a specific time point (or slot), the UE (or the base station) may preferentially select, from among search space sets existing at the corresponding time point, a search space set having a search space type configured as a common search space over a search space set having a search space type configured as a UE-specific search space.

When search space sets configured as a common search space set are all selected (i.e., when condition A is satisfied even after all the search space sets configured as the common search space set are selected), the UE (or the base station) may select search space sets configured as a UE-specific search space set. In this case, when there are a plurality of search space sets configured as a UE-specific search space set, a search space set having a lower search space set index may have a higher priority. The UE or the base station may select UE-specific search space sets within a range in which condition A is satisfied in consideration of priority.

In an NR or 5G communication system, a base station or a UE may transmit and receive signals in an unlicensed broadband spectrum, and the unlicensed broadband spectrum may be configured in units of a subband (e.g., 20 MHz). The base station and the UE may perform a channel access procedure on a subband basis in order to occupy an unlicensed band, access the unlicensed band by accessing at least one of all subbands, one subband, or consecutive subbands determined to be idle as a result of performing the channel access procedure, and perform a configured signal transmission. Moreover, in the NR system, because a CORESET (or search space is configured per BWP, PDCCH candidates to be monitored may be omitted when an available subband is changed according to the result of the channel access procedure. Thus, unlike in the NR system, a subband needs to be further considered when configuring a CORESET for an unlicensed broadband spectrum.

In the disclosure, when a base station and a UE are configured to receive or transmit a downlink or uplink signal in an unlicensed broadband spectrum, a method of configuring a CORESET for the UE by the base station is proposed. In detail, the disclosure proposes a method and apparatus for indicating (or changing or adjusting) CORESET configuration information in consideration of a subband and changing or adjusting the CORESET configuration information by using a result of a channel access procedure.

Hereinafter, methods and apparatuses proposed in embodiments of the disclosure are not limited to the embodiments, but may be applied to a method and apparatus for configuring or determining a CORESET for monitoring or detecting a PDCCH by using a combination of all or some of one or more embodiments proposed in the disclosure. Furthermore, although an embodiment of the disclosure will be described with respect to a case where a base station configures a CORESET in a subband-based unlicensed broadband spectrum, this is merely an example, and the disclosure may also be applied when a CORESET is configured in a broadband system such as multi-carrier or carrier aggregation transmission system. Furthermore, the disclosure may be applied when a CORESET is configured in a single carrier or single-band system as well as in a broadband system. In addition, although an embodiment of the disclosure will be described on the assumption that the base station and the UE operate in the unlicensed band, the methods and apparatuses proposed in the embodiments of the disclosure may also be applied to a base station and a UE operating in a licensed spectrum or a shared spectrum as well as an unlicensed band.

Embodiment 1

Embodiment 1 proposes a method of configuring, by a base station, a CORESET for a UE in a unlicensed broadband spectrum. In detail, according to the Embodiment 1, a CORESET configured in a BWP may be included in a specific subband, and the same CORESET configuration information as configured in the specific subband may be used in other subbands.

Figure 6:
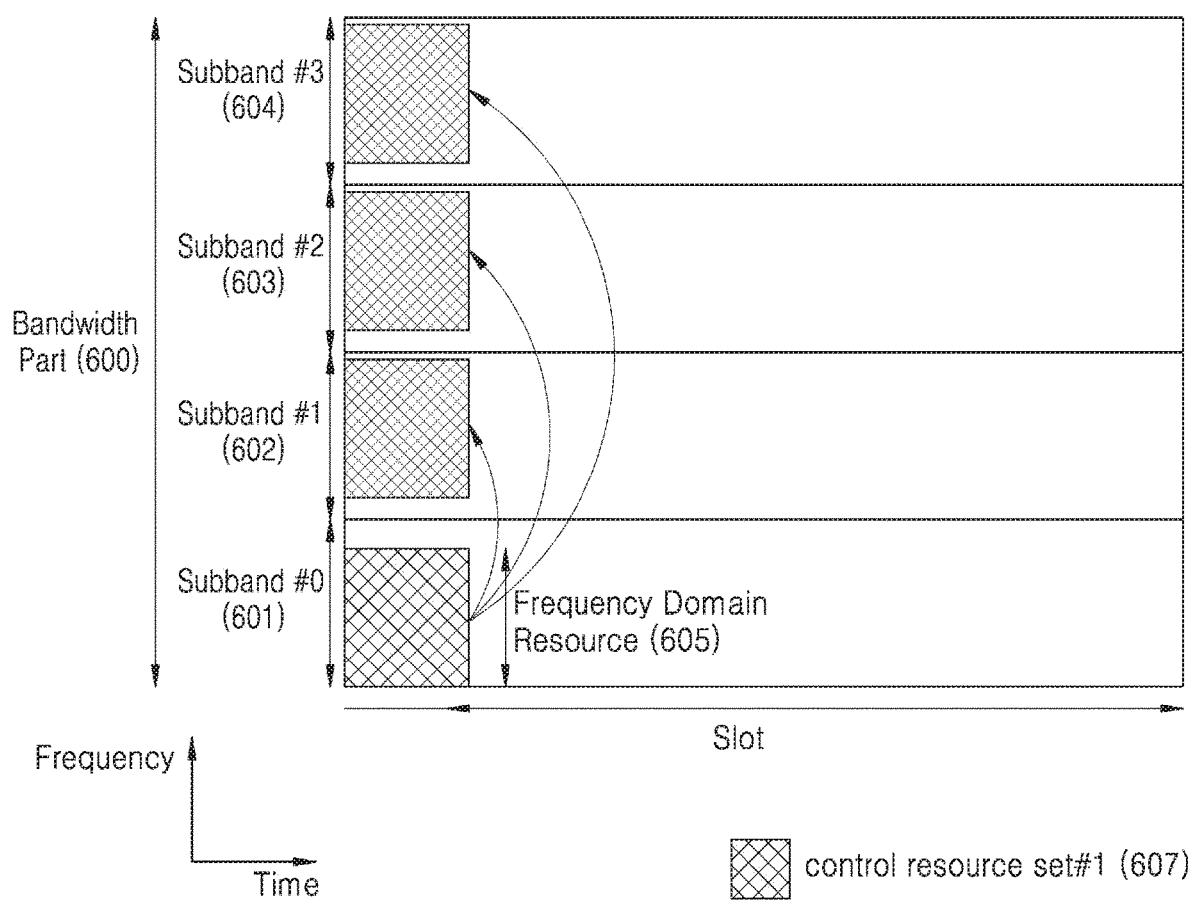
FIG. 6 is a diagram for explaining a method of configuring a CORESET according to an embodiment of the disclosure.

FIG. 6 is a diagram for explaining a method of configuring a CORESET according to an embodiment of the disclosure.

Referring to FIG. 6, an operation according to the embodiment of the disclosure will now be described.

When the base station and the UE transmit and receive signals in an unlicensed broadband spectrum, it is assumed that the base station is configured to perform, after performing the channel access procedure on a subband basis, PDCCH/PDSCH transmission by accessing a subband determined to be idle according to a result of performing the channel access procedure. Here, a subband of the unlicensed band that can be accessed means at least one idle subband. The base station may configure a CORESET 607 within a BWP 600. In this case, the configured CORESET 607 may be included only in a reference subband 601.

In an embodiment of the disclosure, the reference subband 601 may be determined or configured by a lowest subband index, a subband index including an SS/PBCH block, or a subband index including CORESET #0. Alternatively, in an embodiment of the disclosure, the base station may configure a subband index for the UE via higher layer signaling or a control channel. CORESET configuration information for subbands 602, 603, and 604 other than the reference subband 601 may be the same as CORESET configuration information included in the reference subband 601. In this case, the same CORESET index may be applied in each subband, and the number of PDCCH candidates may be set within a configured maximum number of PDCCH candidates. Hereinafter, a method of configuring a frequency resource 605 when CORESET information configured in a specific subband is applied equally in other subbands is proposed.

Embodiment 1-1

Figure 7:
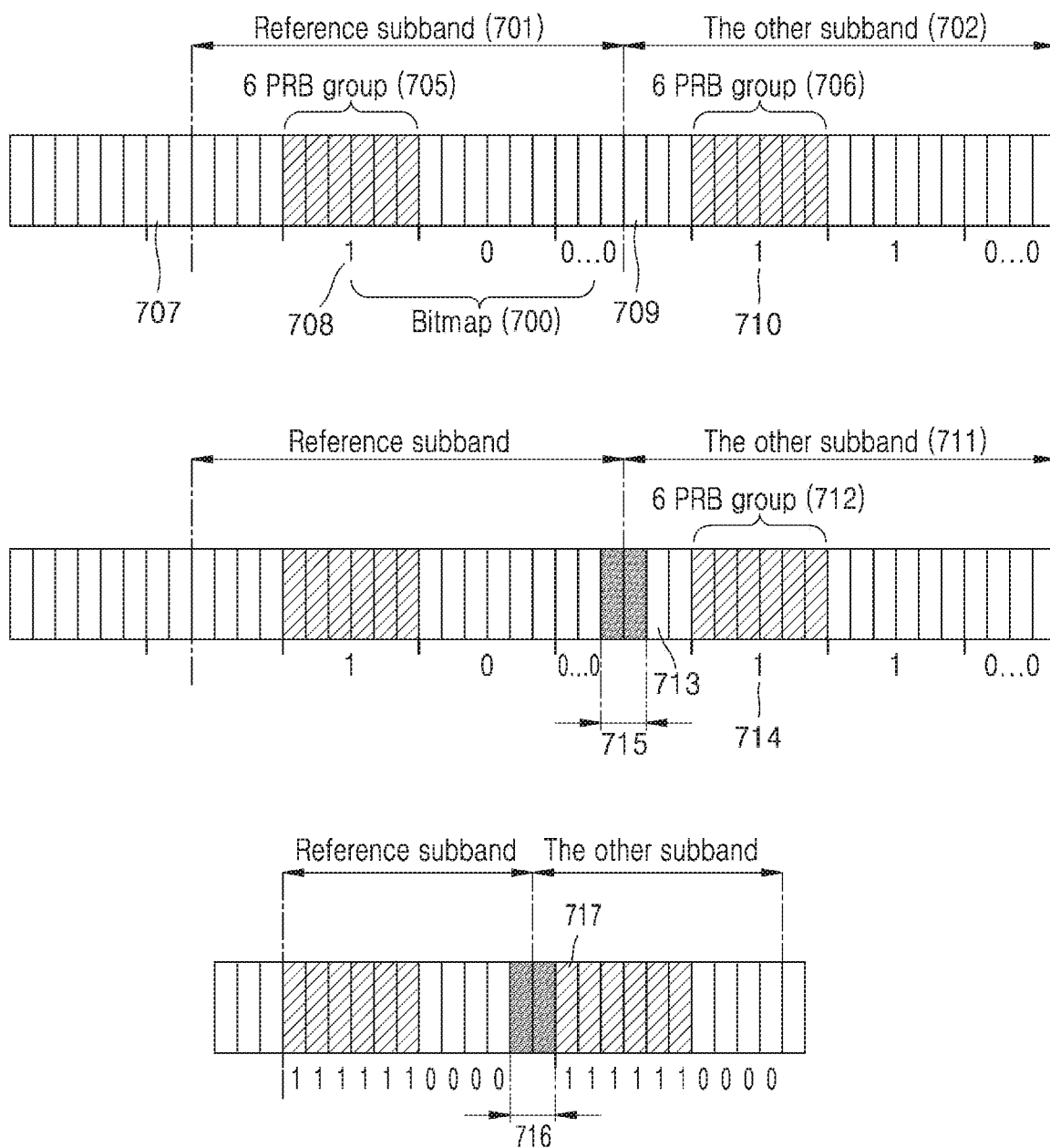
FIG. 7 is a diagram for explaining a method of configuring a CORESET according to an embodiment of the disclosure.

FIG. 7 is a diagram for explaining a method of configuring a frequency resource according to an embodiment of the disclosure.

Referring to FIG. 7, an operation according to the Embodiment 1-1 will now be described.

In NR, a frequency resource of a CORESET in a BWP is configured through a bitmap as described above, and the first bit in the bitmap may mean a first 6 PRB group (e.g., 705) located after a starting PRB of the BWP. In this regard, when another subband 702 has the same CORESET configuration information as a reference subband 701 to which configuration of the CORESET in the BWP is limited as in the operation of the embodiment, bits for configuring a frequency resource may indicate different frequency resource locations for each subband. Referring to FIG. 7, for example, a frequency resource location indicated by the first bit 710 of a bitmap in the other subband 702 may be different from a frequency resource location indicated by the first bit 708 of a bitmap 700 in the reference subband 701. Accordingly, a method of determining and changing a configuration of (or reconfiguring) a frequency resource region through a bitmap may be required and will be described in detail below.

[Method 1] Determining a Bitmap for Each PRB Group

When a bitmap indicating a CORESET frequency resource configured in a reference subband is the same as that for a subband other than the reference subband, the base station and the UE may determine that the first bit in the bitmap indicates a first X PRB group (for example, X=6) after the starting PRB of each subband. For example, referring to FIG. 7, the first bit 708 of the bitmap 700 indicating a frequency resource of a CORESET configured in the reference subband 701 may mean the first 6 PRB group 705 after the starting PRB 707 of the reference subband 701.

On the other hand, when the same bitmap as in the reference subband 701 is configured in the other subband 702, the first bit 710 may indicate a first 6 PRB group 706 after a starting PRB 709 of the other subband 702. To achieve this, the base station may configure a separate bitmap for each subband, which may be included in CORESET information or in configuration information other than CORESET configuration information. Alternatively, the base station may indicate (or change) a method of determining a bitmap by the UE via a downlink control channel. When there is a gap between subbands, the base station may configure the UE with information about the gap via a higher layer signal. At this time, the gap information may be previously defined between the base station and the UE, and the gap may vary based on at least one of a subband size or a carrier size. Here, the gap may mean a subcarrier or PRB in which the UE does not receive at least a downlink control channel. In this case, the gap formation may be transmitted to the UE in CORESET configuration information, may be included in configuration information other than the CORESET configuration information, or may be transmitted via a downlink control channel. The UE receiving the gap information may determine bit information of the bitmap in consideration of the gap. Referring to FIG. 7, for example, a UE receiving gap interval information 715 may determine a location of a starting PRB 713 of the other subband 711 based on the gap interval information 715 and then determine a first 6 PRB group 714.

[Method 2] Configuring Bitmap for Each PRB

When a bitmap is used to indicate a frequency resource of a CORESET, the base station may configure the bitmap so that each bit therein may indicate one PRB. When the bitmap is configured in units of 1 PRB, the first bit in the bitmap representing a CORESET frequency resource may indicate the same frequency resource location in each subband. To achieve this, the base station may configure a separate bitmap for each subband, and the separate map may be included in CORESET configuration information or in configuration information other than the CORESET configuration information. Alternatively, the base station may indicate (or change) a method of determining a bitmap by the UE via a downlink control channel. When there is a gap between subbands, the UE may receive information 716 about the gap and determine a starting PRB location 717 in a subband other than a reference subband in consideration of the information 716 about the gap.

[Method 3] Configuring Index of PRB Group Based on Subband

The base station may configure an X PRB group (e. g., X=6) based on a starting PRB in a subband. For example, the first bit of a bitmap for configuring a frequency resource in a reference subband may indicate a group of 6 PRBs from a starting PRB of the subband. Similarly, in another subband having the same CORESET configuration information as in the reference band, the first bit of a bitmap may indicate a range from a starting PRB of the other subband to a 6 PRB group. Accordingly, a 6 PRB group index indicated by a bit of the bitmap in the CORESET configuration information of each subband may indicate the same frequency resource in each subband. To achieve this, the base station may configure a separate bitmap for each subband, which may be included in CORESET configuration information or in configuration information other than the CORESET configuration information. Alternatively, the base station may indicate (or change) a method of determining a bitmap by the UE via the downlink control channel. When there is a gap between subbands, the UE may receive information about the gap and determine a starting PRB location in a subband other than a reference subband in consideration of the information about the gap in the manner as described above.

Embodiment 2

Embodiment 2 proposes a method of configuring, by a base station, a CORESET for a UE in an unlicensed broadband spectrum. In detail, the Embodiment 2 proposes a method and apparatus by which a CORESET configured based on a BWP includes all subbands.

Figure 8A:
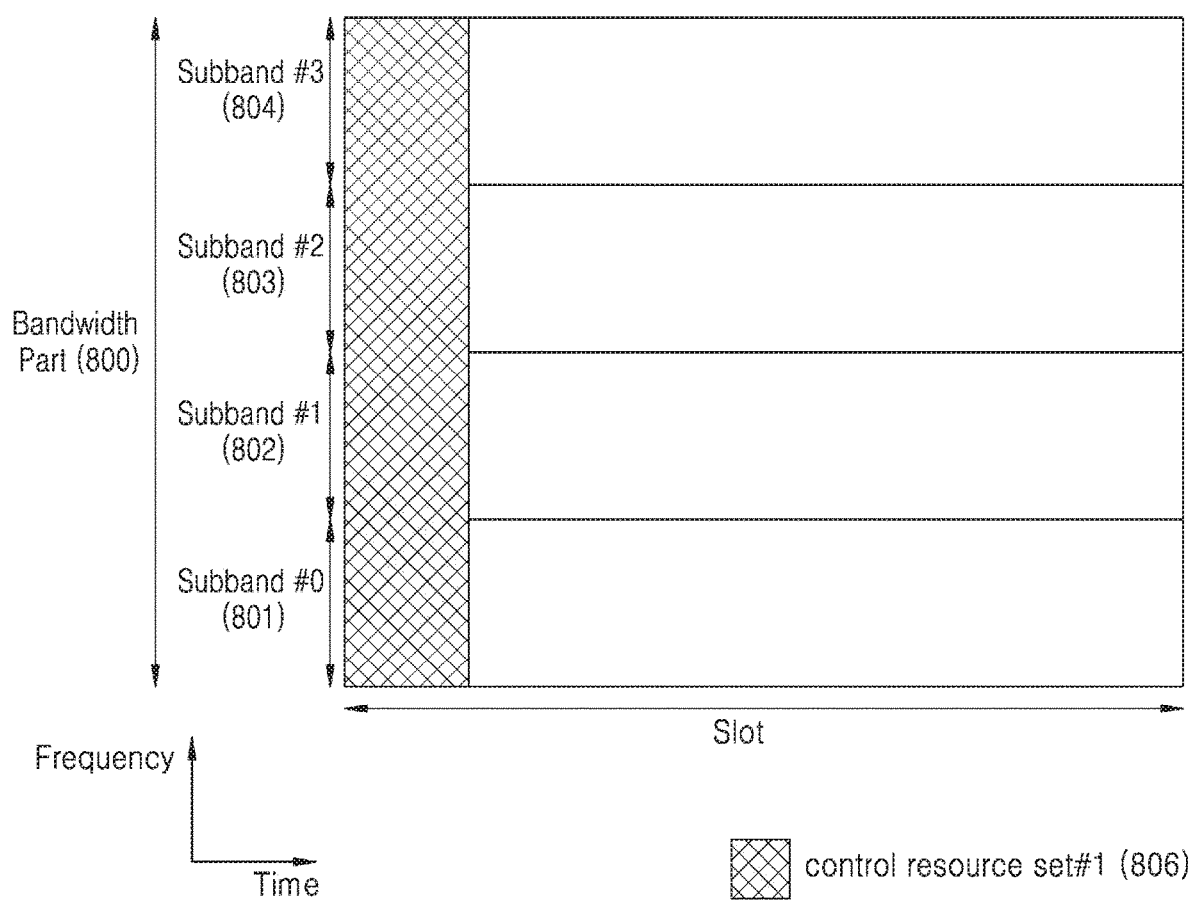
FIG. 8A is a diagram for explaining a method of configuring a CORESET according to an embodiment of the disclosure.

FIG. 8A is a diagram for explaining a method of configuring a CORESET according to an embodiment of the disclosure.

Referring to FIG. 8A, an operation according to the Embodiment 2 will now be described.

When the base station and the UE transmit and receive signals in an unlicensed broadband spectrum, it is assumed that the base station is configured to perform, after performing the channel access procedure on a subband basis, PDCCH/PDSCH transmission by accessing a subband determined to be idle according to a result of performing the channel access procedure. Here, a subband of the unlicensed band that can be accessed means at least one idle subband. The base station may configure a CORESET 806 within a BWP 800. In this case, the configured CORESET 806 may include all subbands 801, 802, 803, and 804. In other words, a frequency resource of the CORESET 806 configured in the BWP 800 may include all subbands. According to an embodiment of the disclosure, it is possible to configure a CORESET in an unlicensed broadband spectrum based on an existing NR. However, when the number of subbands that can be accessed is reduced due to a channel access procedure failure, the number of PDCCH candidates configured in the BWP 800 and to be monitored may be decreased. Thus, a method of preventing the number of PDCCH candidates from decreasing due to a channel access procedure or a gap between subbands may be required to ensure PDCCH decoding performance, and methods for accomplishing the same will now be described in detail.

Embodiment 2-1

When at least one CCE (or REG) constituting a PDCCH candidate is lost due to a result of performing a channel access procedure or a gap between subbands, the base station may transmit a PDCCH after puncturing a CCE (or REG) configured in a region not available for transmission. The UE may perform PDCCH decoding based on CORESET information configured by the base station before puncturing.

Embodiment 2-2

When configuring a CCE index, the base station may set the number of PDCCH candidates per AL for each subband. For example, when the number of subbands is N and the number of PDCCH candidates for AL L is M, the base station may configure at least the number of $$\left\lfloor \frac{M}{N} \right\rfloor$$

PDCCH candidates in each subband. In this case, the base station may configure $$\left\lfloor \frac{M}{N} \right\rfloor$$

or more PDCCH candidates within a range not exceeding the number of M PDCCH candidates for at least one subband having the lowest (or highest) index, or for at least one particular subband. Furthermore, when configuring the CCE index, the base station may configure the number of CCEs for each subband, not for a BWP. For example, when the base station configures the number of $N_{CCE}$ CCEs in the BWP, it may configure the number of available $N_{CCE,j}$ CCEs in a j-th subband. Furthermore, the base station may set a CCE index for the j-th subband based on $N_{CCE,j}$.

Moreover, when the base station intends to perform CCE-to-REG mapping in an interleaved manner, the base station may limit the CCE-to-REG mapping for each subband. For example, when the base station has the number of $N_{REG}$ REGs in the BWP, the j-th subband may have the number of $N_{REG\ j}$ REGs. In this case, the base station may configure a CCE in the j-th subband by using $N_{REG\ j}$ when performing the CCE-to-REG mapping in an interleaved manner.

Figure 8B:
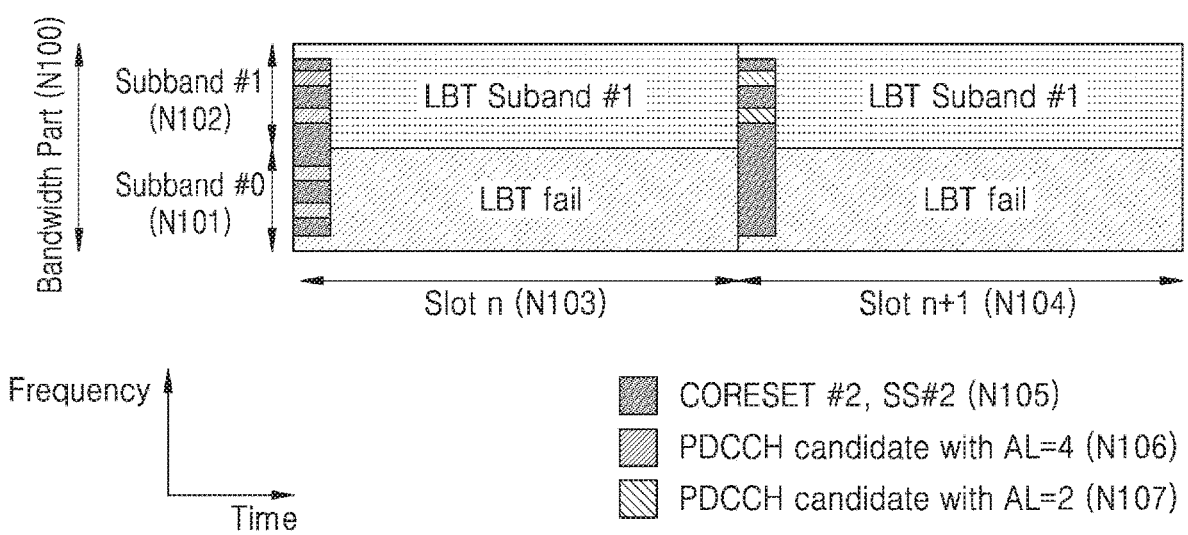
FIG. 8B is a diagram for explaining a method of configuring a CORESET according to an embodiment of the disclosure.

FIG. 8B is a diagram for explaining a method of configuring a CORESET according to an embodiment of the disclosure.

Embodiment 2-3

Referring to FIG. 8B, in the embodiment of the disclosure, a method of changing configuration of a PDCCH candidate by a base station after performing a channel access procedure will now be described. The base station may not use a PDCCH candidate N106 in a corresponding slot n N103 when at least one CCE (or REG) constituting the PDCCH candidate is lost due to a result of performing a channel access procedure or a gap between subbands. Moreover, the base station may reconfigure a PDCCH candidate N107 by using a CCE allocated on a subband N102 that is available for transmission after at least one slot n+1 N104. For example, in the slot n N103, the base station may configure a PDCCH candidate at AL 4 in subband #0 N101 and subband #1 N102. In this case, when the subband #0 N101 is not determined to be an idle channel as a result of performing the channel access procedure, the base station may not use the PDCCH candidate N106 with AL 4 in the slot n N103. However, the base station may use the PDCCH candidate N107 with AL 2 by using a CCE allocated on a subband #1 N102 that is available for transmission from the slot n+1 N 104. In this case, when the base station allows the UE to determine (or implicitly indicate to the UE) the result of performing the channel access procedure via DCI or a reference signal, the base station may indicate to the UE a change of a PDCCH candidate configuration based on the indicated result of performing the channel access procedure.

Embodiment 2-4

In this embodiment, it is assumed that the base station allows the UE to determine (or implicitly indicate to the UE) a result of performing a channel access procedure via a control channel or a reference signal. The UE that has received from the base station or determined the result of performing the channel access procedure for each subband in this way (or an indicator indicating whether to occupy a channel for each subband) may perform PDCCH monitoring only in at least one subband determined to be idle as the result of performing the channel access procedure by the base station. In this case, the base station may change, during interleaved CCE-to-REG mapping, the number of REGs on a BWP basis to the number of REGs based on a subband in which the PDCCH monitoring is to be performed. In other words, CCEs may be interleaved in at least one subband where PDCCH monitoring is to be performed rather than in a BWP and then mapped to REG bundles. When the UE fails to receive the result of performing the channel access procedure, the base station may not change a method of setting the number of REGs.

Embodiment 2-5

The base station may not transmit a PDCCH candidate when at least one CCE (or REG), RB, or RE constituting a PDCCH candidate is lost due to a result of performing a channel access procedure or a gap between subbands.

Embodiment 3

Embodiment 3 proposes a method of configuring, by a base station, a CORESET for a UE in an unlicensed broadband spectrum. In detail, a method and apparatus capable of configuring a CORESET for each subband are proposed.

Figure 9:
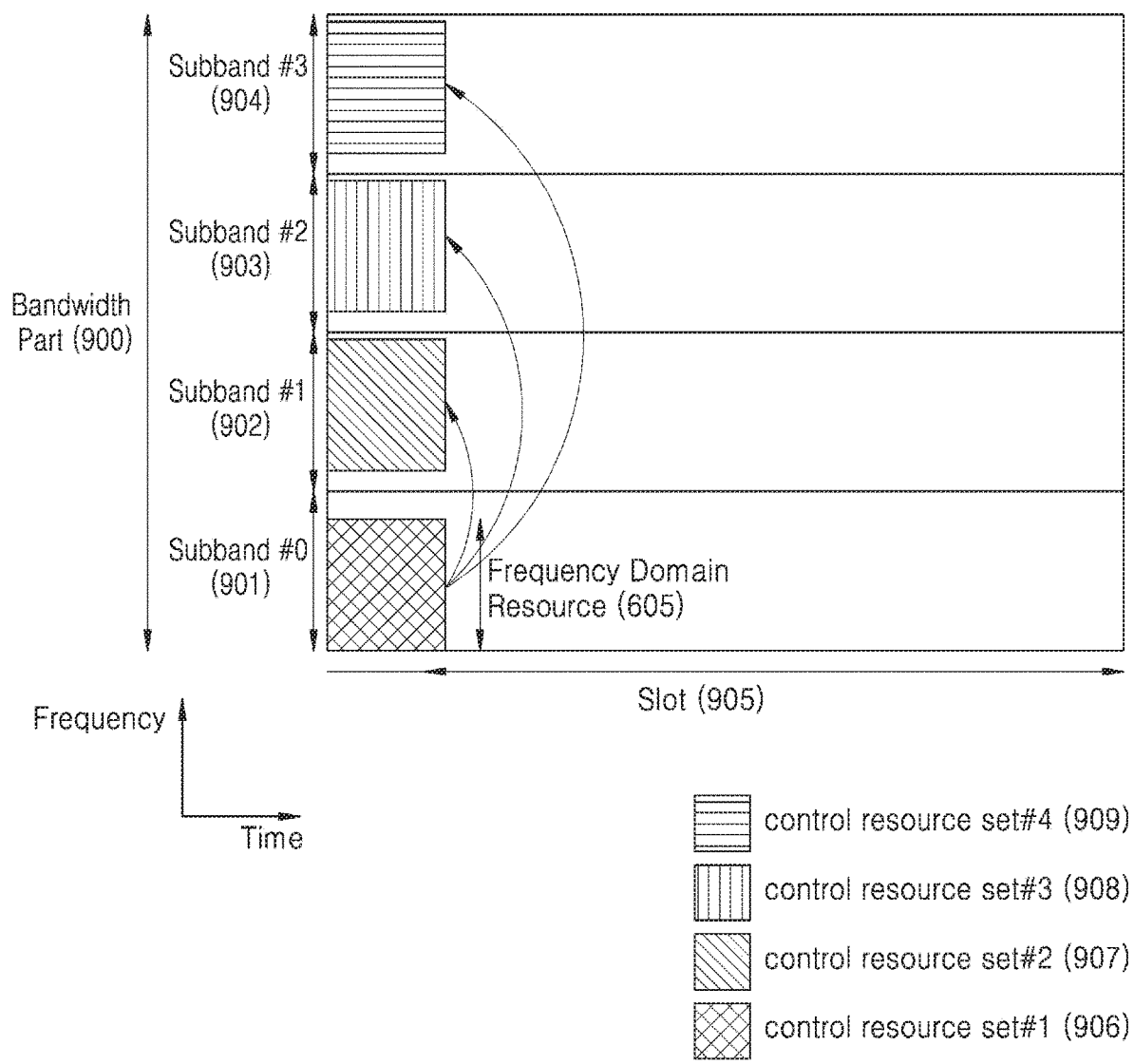
FIG. 9 is a diagram for explaining a method of configuring a CORESET according to an embodiment of the disclosure.

FIG. 9 is a diagram for explaining a method of configuring a CORESET according to an embodiment of the disclosure.

Referring to FIG. 9, an operation according to the embodiment of the disclosure will now be described.

When a base station and a UE transmit and receive signals in an unlicensed broadband spectrum, it is assumed that the base station is configured to perform, after performing the channel access procedure on a subband basis, PDCCH/PDSCH transmission by accessing a subband determined to be idle according to a result of performing the channel access procedure. Here, a subband of the unlicensed band that can be accessed means at least one idle subband. The base station may separately configure the CORESET for each subband. In detail, subbands #0 through #3 901 through 904 may respectively have CORESET numbers #1 through #4 906 through 909. In this case, a CORESET configuration for each subband may be the same or different. According to an embodiment of the disclosure, a CORESET may be flexibly configured for each subband. However, to provide such a flexible configuration, the number of CORESET numbers in a BWP 900 may need to be increased.

Embodiment 4

Embodiment 4 proposes a method of performing, by the base station, the channel access procedure in units of subbands and determining, by the UE, a subband where PDCCH monitoring is to be performed.

In detail, the base station may perform a channel access procedure in units of subbands when an allocated carrier BW or BWP is greater than or equal to a predetermined size (e.g., 20 MHz). In this case, the base station may inform the UE of the result of performing the channel access procedure via a downlink control channel or a reference signal. Furthermore, the base station may allow the UE to determine (or implicitly indicate to the UE) the result of performing the channel access procedure via the downlink control channel or reference signal. The UE that has received from the base station or determined the result of performing the channel access procedure for each subband in this way (or an indicator indicating whether to occupy a channel for each subband) may perform PDCCH monitoring only in at least one subband determined to be idle as the result of performing the channel access procedure by the base station. Specific embodiments are as follows.

[Method 1]

The UE that has received or determined the result of performing the channel access procedure for each subband of the base station may perform PDCCH monitoring only in at least one subband determined as an idle band.

[Method 2]

The UE that has received or determined the result of performing the channel access procedure on each subband of the base station may perform PDCCH monitoring only in a subband having the lowest (or highest) subband index from among at least one subband determined as an idle band. According to another method, the UE may perform PDCCH monitoring only in a subband including a CORESET #0 or an SS/PBCH block. According to another method, the UE may perform PDCCH monitoring PDCCH in a subband indicated by the base station via a higher layer signal or control channel. Furthermore, the base station may perform PDCCH monitoring by using one or more combinations of the above-described methods.

[Method 3]

The UE that has received or determined the result of performing the channel access procedure for each subband of the base station may select and configure at least one specific subband, in which PDCCH monitoring is to be performed according to a specific rule, from among at least one subband determined as an idle band. For example, the UE may determine a specific subband by using a combination of at least one of a UE number (UE ID), an RNTI value, or the number of K idle subbands. For example, the UE may perform PDCCH monitoring in a subband with an index determined by mod(UE ID×RNTI, K).

When the base station does not receive or determine the result of performing the channel access procedure for each subband, the UE may perform PDCCH monitoring in all subbands. After changing (or reconfiguring) a subband where PDCCH monitoring is to be performed via a combination of at least one of the above-described methods by receiving from the base station or determining a result of performing a channel access procedure for each subband, the UE may monitor a PDCCH candidate based on the changed configuration (or reconfiguration result) within at least a maximum available channel occupancy time. In this case, the UE may change its configurations or may be reconfigured to perform PDCCH monitoring for all subbands after the maximum available channel occupancy time elapses. Furthermore, after changing (or reconfiguring) the subband where monitoring is to be performed, the UE or the base station may reconfigure a CCE index based on the number of PDCCH candidates to be monitored or the number of CCEs.

Embodiment 5

Embodiment 5 proposes a method of adjusting (or changing) or determining the number of PDCCH candidates for subbands in which PDCCH monitoring is to be performed.

In detail, it is assumed that a UE receives and determines a result of performing a channel access procedure for each subband of the base station (or an indicator indicating whether to occupy a channel for each subband). The UE may perform PDCCH monitoring only in at least one idle subband by using the received or determined result. Moreover, the number of PDCCH candidates that the UE can monitor per slot may be limited. Accordingly, when the UE performs PDCCH monitoring only in an idle subband, a PDCCH candidate that can be monitored but configured in a subband where PDCCH monitoring is not performed is unusable, and thus the PDCCH transmission capacity may be reduced. Therefore, when a subband where a PDCCH is to be monitored is changed (or reconfigured) according to the result of performing the channel access procedure for each subband of the base station, a method of changing (or configuring) the number of PDCCH candidates for at least one subband where PDCCH monitoring is to be performed may be required. Specific embodiments are as follows.

[Method 1]

When at least one subband where PDCCH monitoring is to be performed is determined, the UE may adjust (or change) the number of PDCCH candidates by using the number of the determined subbands. For example, when the number of configured PDCCH candidates that can be monitored per slot is M and the number of subbands where PDCCH monitoring is to be performed is N, the number of PDCCH candidates that can be monitored in each of at least one subband where the PDCCH monitoring is to be performed may be determined as [M/N].

[Method 2]

The base station may indicate (or change), via a control channel, the number of PDCCH candidates for at least one or more subbands in which the UE is to perform PDCCH monitoring. For example, the base station may indicate (or change) the number of PDCCH candidates for a subband where the UE is to perform PDCCH monitoring by using information included in control information such as scheduling DCI (or UE-specific DCI) or group common DCI. As another example, the UE may indicate (or change), via an indicator indicating whether to occupy channels for each subband, the number of PDCCH candidates at a subband where the UE is to perform PDCCH monitoring. As another example, the base station may use a DMRS to inform the UE about the number of PDCCH candidates at a subband where the UE is to perform PDCCH monitoring. For example, a specific DMRS sequence or resource location may be associated with the number of PDCCH candidates.

[Method 3]

When the UE adjusts the number of PDCCH candidates in a subband where it is to perform PDCCH monitoring, the number of PDCCH candidates in a specific search space may not be adjusted (or changed). For example, the UE may adjust (or change) the number of PDCCH candidates only in the UE-specific search space. As another example, the UE may not adjust (or change) the number of PDCCH candidates for only a specific search space. For example, the UE may not adjust (or change) the number of PDCCH candidates for a common search space, a search space including DCI indicating a result of performing a channel access procedure, or a search space in which group common DCI is monitored.

[Method 4]

When the UE determines or receives an indication that the number of PDCCH candidates is to be adjusted (or changed) for a subband where PDCCH monitoring is to be performed, the base station and the UE may determine the timing at which the adjusted (or changed) number of PDCCH candidates are to be applied to be after a predetermined slot or time (or after the timer expires). As another method, after the UE determines or receives an indication that the number of PDCCH candidates is to be adjusted (or changed) for a subband where PDCCH monitoring is to be performed, the UE may confirm or transmit a confirmation signal indicating adjustment (or change) of the number of PDCCH candidates to the base station by using an uplink control signal, a data signal, or a reference signal.

When the UE fails to determine or receive an indication that the number of PDCCH candidates is to be adjusted (or changed) for a subband where PDCCH monitoring is to be performed, the UE may perform the PDCCH monitoring by using the initially configured number of PDCCH candidates. When the UE determine or receive an indication that the number of PDCCH candidates is to be adjusted (or changed) for a subband where PDCCH monitoring is to be performed and adjusts (or changes) the number of PDCCH candidates in combination with at least one of the above-described methods, the UE may perform the PDCCH monitoring with the adjusted (changed) number of PDCCH candidates within at least the maximum available channel occupancy time. In this case, the UE may perform PDCCH monitoring with the number of PDCCH candidates which is initially configured (or configured prior to the adjustment (or change) after the maximum available channel occupancy time. Furthermore, the UE and the base station may reconfigure the CCE index based on the changed number of PDCCH candidates or the number of CCEs after adjusting (or changing) the number of PDCCH candidates to be monitored.

Embodiment 6

Embodiment 6 proposes a method of configuring, by a base station, a CORESET for a UE in an unlicensed broadband spectrum. In detail, according to this embodiment of the disclosure, a CORESET (or configuration information) configured in a BWP may be included in a specific subband. The base station may configure the UE with CORESET configuration information for a specific subband such that the CORESET configuration information is equally applied in (or is shared with or repeated in) at least one subband other than the specific subband. Methods capable of configuring, by the base station, the UE with CORESET configuration information to be equally applied in (or be shared with or repeated in) at least one subband will now be described in detail.

[Method 1]

The base station may use a specific CORESET index to indicate to the UE (or allow the UE to determine) that the same CORESET configuration information is applied in (or is shared with or repeated in) at least one subband within a BWP or a subband scheduled by the base station. In other words, the UE may determine that CORESET configuration information configured by the base station in association with a CORESET index X will be equally applied (or configured) in (or be shared with or repeated in) in at least one subband. Furthermore, by configuring a separate subband index in the CORESET configuration information, the base station may indicate to the UE (or allow the UE to determine) an index of at least one subband where the same (or shared or repeated) CORESET configuration information is configured.

[Method 2]

The base station may indicate to the UE (or allow the UE to determine) that CORESET configuration information associated with a specific search space index is equally applied in (or is shared with or repeated in) at least one subband within a BWP or a subband scheduled by the base station. Furthermore, by configuring a separate subband index in a search space configuration, the base station may indicate to the UE (or allow the UE to determine) an index of at least one subband where the same (or shared or repeated) CORESET configuration information is configured. According to another method, the base station may indicate to the UE (or allow the UE to determine) a starting point of a frequency resource of each subband to which CORESET configuration information will be equally applied (or shared or repeated) by using an offset value from a specific PRB #Y (e. g., common PRB #0) within a search space configuration. According to another method, the base station may indicate to the UE (or allow the UE to determine) a starting point of a frequency resource of each subband to which CORESET configuration information will be equally applied (or shared or repeated) by using an offset value from a specific PRB #X for each subband (e. g., a starting PRB for each subband) within a search space configuration.

[Method 3]

The UE that has received or determined a result of performing a channel access procedure for each subband of the base station may determine that the same (or shared or repeated) CORESET configuration information is applied in at least one subband determined to be an idle band (or transmission band). In this case, when the result of performing the channel access procedure, which is received by the UE, is different from configuration information of the at least one subband where the same (or shared or repeated) CORESET configuration information configured via higher layer signaling is to be applied, the UE may determine, based on the result of performing the channel access procedure from the base station, the configuration information of the at least one subband to which the same (or shared or repeated) CORESET configuration information is to be applied.

[Method 4]

The base station may indicate to the UE whether to configure the same (or shared or repeated) CORESET in control information via bit signaling A UE that receives the same (or shared or repeated) transmission indicator may determine that the same information is repeated, while a UE that does not receive the transmission indicator may determine that CORESET monitoring is performed only in a specific subband.

Embodiment 7

This embodiment proposes a method of receiving, by the UE, control signals in a plurality of CORESETs configured by a base station in an unlicensed broadband spectrum. More specifically, according to this embodiment of the disclosure, a CORESET (or configuration information) configured in a BWP may be included in a specific subband. The base station may configure the UE with CORESET configuration information for a specific subband such that the CORESET configuration information is equally applied in (or is shared with or repeated in) at least one subband other than the specific subband. Moreover, the UE may receive a plurality of pieces of control information in a CORESET configured equally (or shared or repeated) in a plurality of subbands. When the UE is capable of receiving (or decoding or demodulating) only some of the plurality pieces of control information transmitted by the base station, the UE may receive (or decode or demodulate) the corresponding control information based on the following rules.

[Method 1]

The UE may receive (or decode or demodulate) the number of X pieces of control information that can be received (or decoded or demodulated) in a lowest (or highest) subband index. As another method, the UE may preferentially receive (or decode or demodulate) control information received in a subband index including CORESET #0. According to another method, the UE may preferentially receive (or decode or demodulate) control information transmitted in a subband index including SS/PBCH blocks. Furthermore, the UE may determine the number of X pieces of control information to be received (or decoded or demodulated) by using a combination of at least one of the above-described methods.

Embodiment 8

This embodiment proposes a method of configuring, by a base station, a CORESET for a UE in an unlicensed broadband spectrum. In detail, according to this embodiment of the disclosure, a CORESET (or configuration information) configured in a BWP may be included in a specific subband. The base station may configure the UE with CORESET configuration information for a specific subband such that the CORESET configuration information is equally applied in (or is shared with or repeated in) at least one subband other than the specific subband.

In this case, to configure the CORESET configuration information to be applied equally in (be shared with or repeated in) the at least one subband, the base station may indicate, when configuring a search space, a subband in which the CORESET configuration information is to be configured equally (shared or repeated) through a bitmap. Moreover, when configuring the CORESET, the base station may indicate a first RB (or a common resource block (CRB)) of a 6RB group in a BWP by configuring an offset value (e.g., rb-Offset that is an offset in units of resource block (RB)) in the CORESET. When the base station does not configure the offset value therein, the UE may determine that the offset value is 0, but embodiments of the disclosure are not limited thereto.

Furthermore, when the base station does not configure an offset value in a CORESET, and a search space does not include a bitmap indicating a subband where the CORESET is to be repeated (or when at least one search space does not include a bitmap indicating a subband where the CORESET is to be repeated, or when none of all search spaces includes a bitmap indicating a subband where the CORESET is to be repeated), a method of configuring the first RB of the 6RB group is as follows. The base station may configure frequencyDomainResources configuration information in the CORESET, e.g., by configuring a frequency resource of the CORESET through a bitmap. Each bit in the bitmap may indicate a group of 6 PRBs that do not overlap. A first group may mean a 6 PRB group having a first PRB index as $6 \cdot \lceil N_{BWP}^{start}/6 \rceil$, and $N_{BWP}^{start}$ may represent a first common RB (CRB) in the first group from among 6 PRB groups. The first bit of the bitmap may indicate the first group and may be set in the ascending order.

Moreover, in a case where the base station configures only an offset value in the CORESET while not configuring a bitmap indicating a subband where the CORESET is to be repeated in the search space, when configuring the group of 6 PRBs, a first RB (CRB or PRB) in a first group (first RB or CRB group) may be $N_{BWP}^{start}$, and an offset value configured in the CORESET may be $N_{BWP}^{start}+rb\_Offset$.

Furthermore, in a case where the base station does not configure an offset value in a CORESET and a bitmap indicating a subband where the CORESET is to be repeated is configured in a search space (or in a case where the bitmap indicating the subband where the CORESET is to be repeated is configured in all search spaces associated with a CORESET configuration or a case where the bitmap indicating the subband where the CORESET is to be repeated is configured in at least one search space associated with the CORESET configuration), the base station may determine a first RB (PRB or CRB) in each subband as a starting RB (or CRB) when configuring a 6 PRB group.

Furthermore, in a case where the base station configures an offset value in a CORESET or configures, in a search space, a bitmap indicating a subband where the CORESET is to be repeated, when configuring the group of 6 PRBs as described above, a first RB (PRB or CRB) in a first group may be indicated by a first RB (PRB or CRB) in each subband and an offset value configured in the CORESET In this case, each subband may exclude a guard band and may be configured via higher layer signaling (RRC, MAC-CE, etc.) or L1 signaling from the base station.

Figure 10:
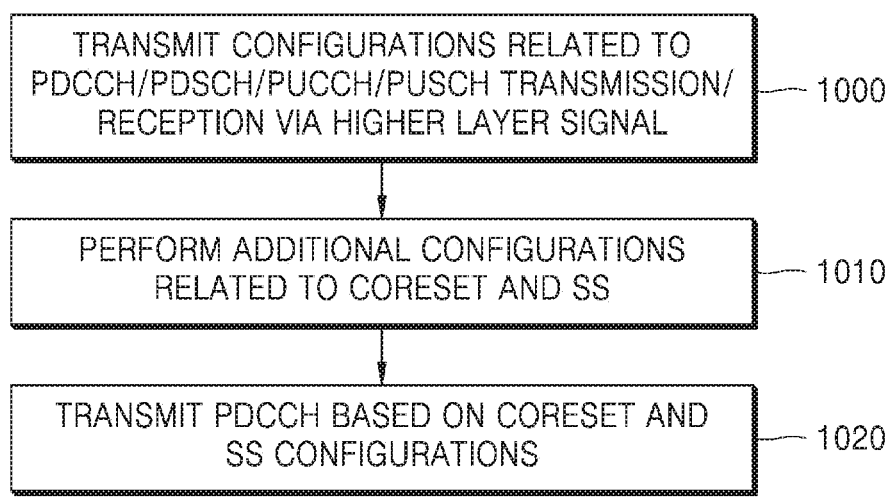
FIG. 10 is a flowchart of an operation of a base station according to an embodiment of the disclosure.

FIG. 10 is a flowchart illustrating an operation of a base station according to an embodiment of the disclosure.

Referring to FIG. 10, the operation of the base station according to the embodiment of the disclosure will now be described.

The base station may transmit configurations related to PDCCH, PDSCH, PUCCH, and PUSCH transmission and reception to the UE via a higher layer signal (operation 1000). For example, the base station may transmit to the UE a PDCCH resource region for receiving downlink or uplink scheduling information, a CORESET configuration, a search space configuration, etc. via a higher layer signal. Furthermore, the base station may transmit configurations related to PDSCH/PUSCH transmission and reception to the UE through the higher layer signal, the configurations including offset information between a PDCCH reception slot and a PDSCH reception slot or PUSCH transmission slot, PDSCH or PUSCH repetitive transmission count information, etc.

The base station may additionally transmit to the UE configuration information related to a CORESET and a search space for an operation in an unlicensed broadband spectrum via a control channel or a higher layer signal (operation 1010). For example, the base station may transmit information such as a method of determining a frequency resource configuration in a CORESET configuration, information about a gap between subbands, a change (or adjustment) in the number of PDCCH candidates, or a subband where PDCCH monitoring is to be performed. In this case, it is possible to transmit, in operation 1000, the configuration information related to the CORESET and search space transmitted to the UE in operation 1010.

The base station may perform control channel transmission based on the CORESET and search space configurations indicated to the UE (operation 1020).

Figure 11:
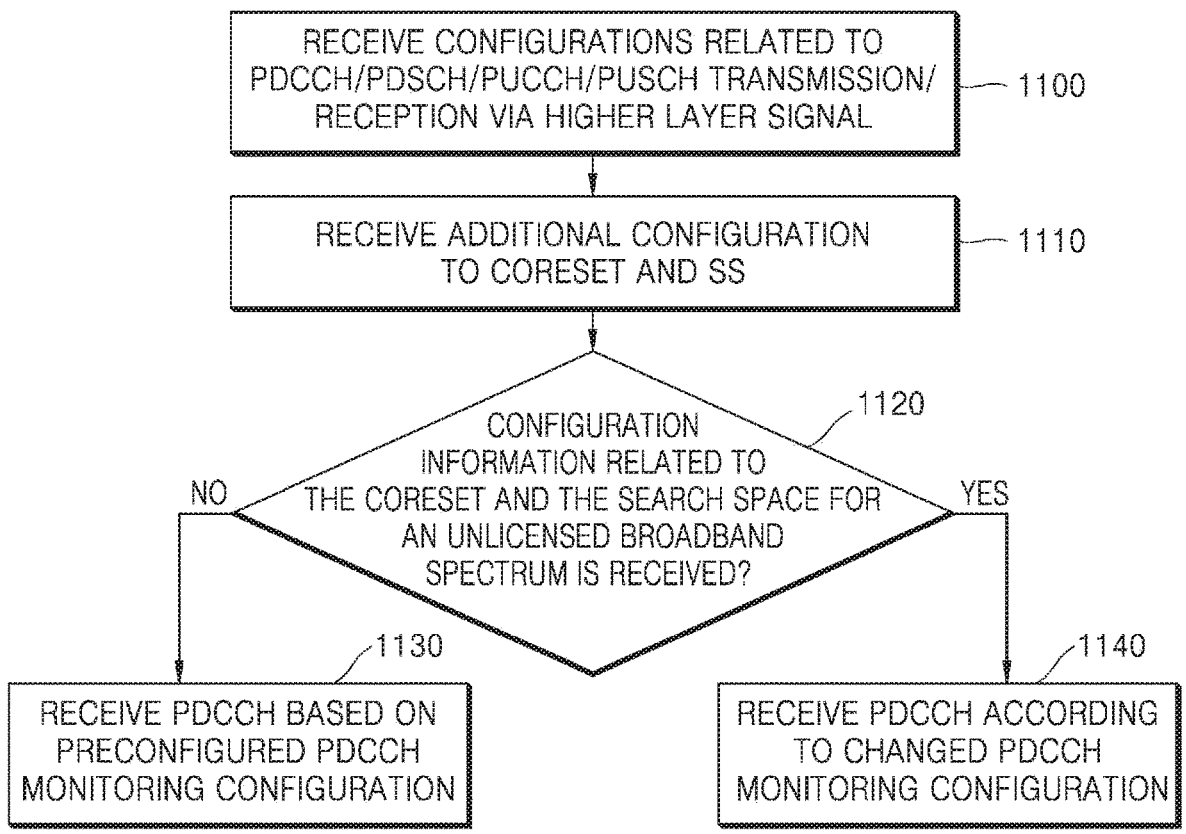
FIG. 11 is a flowchart of an operation of a user equipment (UE) according to an embodiment of the disclosure.

FIG. 11 is a flow chart illustrating an operation of a UE according to an embodiment of the disclosure.

Referring to FIG. 11, the UE may receive configurations related to PDCCH, PDSCH, PUCCH, and PUSCH transmission and reception from a base station via a higher layer signal, and configure the PDCCH, PDSCH, PUCCH, and PUSCH transmission and reception according to the received configuration information (operation 1100). For example, the UE may receive, from the base station, a PDCCH resource region for receiving downlink or uplink scheduling information, a CORESET configuration, a search space configuration, etc. via a higher layer signal.

The UE may additionally receive configuration information related to a CORESET and a search space for an operation in an unlicensed band via a control channel or a higher layer signal (operation 1110). In this case, the configuration information related to the CORESET and the search space in operation 1110 may be included in the configuration information transmitted via the higher layer signal in operation 1100. For example, the base station may transmit information such as a method of determining a frequency resource configuration in a CORESET configuration, information about a gap between subbands, a change in the number of PDCCH candidates, or a subband where PDCCH monitoring is to be performed.

It is determined whether configuration information related to the CORESET and the search space for an unlicensed broadband spectrum has been additionally received (operation 1120).

When it is determined in operation 1120 that the configuration information related to the CORESET and search space has not been received, the configuration information considering a subband for the broadband unlicensed band, the UE may receive a PDCCH based on preconfigured PDCCH monitoring configuration (operation 1130).

When it is determined in operation 1120 that the configuration information related to the CORESET and search space has been received, the configuration information considering a subband for the broadband unlicensed band, the UE may receive a PDCCH based on CORESET configuration information configured (or changed or indicated) by the base station (operation 1140).

Figure 12:
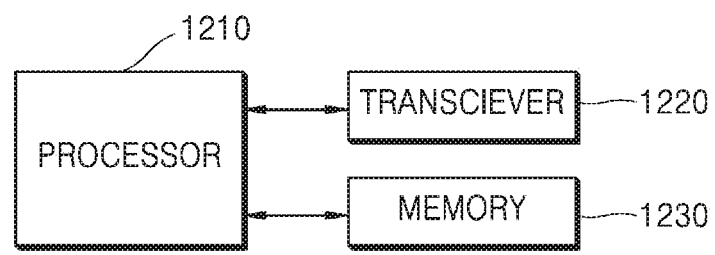
FIG. 12 is a block diagram of a structure of a base station according to an embodiment of the disclosure.

FIG. 12 is a block diagram of a structure of a base station according to an embodiment of the disclosure.

Referring to FIG. 12, it is a block diagram of an internal structure of a base station according to an embodiment of the disclosure. Referring to FIG. 12, the base station of the disclosure may include a processor 1210, a transceiver 1220 and a memory 1230. However, the components of the base station are not limited to the above-described examples. For example, the base station may include more or fewer components than those described above. Furthermore, the processor 1210, the transceiver 1220, and the memory 1230 may be implemented as a single chip.

According to the above-described method of performing communication by the base station, the transceiver 1220 and the processor 1210 may operate.

The transceiver 1220 may transmit or receive signals to or from a UE. Here, the signals may include control information and data. To do so, the transceiver 1220 may include a radio frequency (RF) transmitter for up-converting and amplifying a frequency of a signal to be transmitted and an RF receiver for low-noise amplifying a received signal and down-converting its frequency. However, this is merely an example of the transceiver 1220, and the components of the transceiver 1220 are not limited to the RF transmitter and the RF receiver.

Furthermore, the transceiver 1220 may receive a signal via a radio channel and output the signal to the processor 1210 and transmit a signal output from the processor 1210 via a radio channel.

The processor 1210 may control the memory 1230 to store data and programs necessary for operations of the base station. Furthermore, the processor 1210 may control the memory 1230 to store information or data in a signal transmitted or received by the base station. The processor 1210 may include a memory composed of storage media, such as read-only memory (ROM), random access memory (RAM), hard discs, compact disc (CD)-ROM, and digital video discs (DVDs), or a combination thereof.

The processor 1210 may control a series of processes such that the base station may operate according to the above embodiment of the disclosure. According to an embodiment of the disclosure, the processor 1210 may perform a channel access procedure on an unlicensed band. For example, in detail, the processor 1210 may receive signals transmitted in an unlicensed band via the transceiver 1220 and determine whether the unlicensed band is in an idle state by comparing a strength of the received signal with a threshold predefined or determined by a value of a function having parameters such as a bandwidth. As another example, the processor 1210 may change or reconfigure configuration information related to a CORESET and a search space of the base station according to a channel access procedure result or subband transmission, and control the transceiver 1220 to transmit a downlink control channel according to the changed configuration information.

The memory 1230 may store at least one of information transmitted or received via the transceiver 1220 or information generated by the processor 1210. The memory 1230 may also store control information or data included in an acquired signal. The memory 1230 may be composed of storage media, such as ROM, RAM, hard discs, CD-ROM, and DVDs, or a combination thereof. The memory 1230 may include a plurality of memories.

Figure 13:
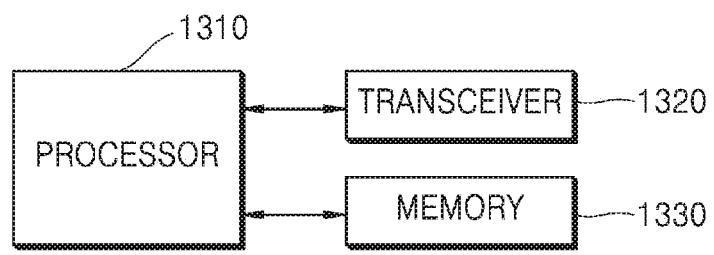
FIG. 13 is a block diagram of a structure of a UE according to an embodiment of the disclosure.

FIG. 13 is a block diagram of an internal structure of a UE according to an embodiment of the disclosure.

Referring to FIG. 13, the UE of the disclosure may include a processor 1310, a transceiver 1320 and a memory 1330. However, the components of the UE are not limited to the above-described examples. For example, the UE may include more or fewer components than those described above. Furthermore, the processor 1310, the transceiver 1320, and the memory 1330 may be implemented as a single chip.

The transceiver 1320 may transmit or receive signals to or from a base station. Here, the signals may include control information and data. To do so, the transceiver 1320 may include an RF transmitter for up-converting and amplifying a frequency of a signal to be transmitted and an RF receiver for low-noise amplifying a received signal and down-converting its frequency. Furthermore, the transceiver 1320 may receive a signal via a radio channel and output the signal to the processor 1310 and transmit a signal output from the processor 1310 via a radio channel.

The processor 1310 may control a series of processes such that the UE may operate according to the above embodiment of the disclosure. For example, the processor 1310 may receive a data signal carrying a control signal via the transceiver 1320 and determine a reception result for the data signal. When the UE needs to transmit a reception result for a first signal including data reception to the base station at a predetermined timing, the processor 1310 may control the transceiver 1320 to transmit the reception result for the first signal to the base station at the predetermined timing. As another example, when receiving, from the base station, information about a change or reconfiguration of configurations of a CORESET and a search space via the transceiver 1320, the processor 1310 may control the transceiver 1320 to receive a downlink control channel and a data signal transmitted by the base station according to the received information.

The memory 1330 may store at least one of information transmitted or received via the transceiver 1320 or information generated by the processor 1310. The memory 1330 may also store control information or data included in an acquired signal. The memory 1230 may be composed of storage media, such as ROM, RAM, hard discs, CD-ROM, and DVDs, or a combination thereof. The memory 1330 may also be configured as a plurality of memories.

While the disclosure has been shown and described to various embodiments thereof, it will be understood by those skilled in the art that various changes in form and details may be made therein without departing from the spirit scope of the disclosure as defined by the appended claims and their equivalents.

What is claimed is:

1. A method of performing communication by a user equipment that is configured with a control resource set (CORESET) by a base station in a wireless communication system, the method comprising:
    receiving, via a higher layer signal, configuration information of a CORESET and configuration information of a search space;
    determining, based on the configuration information of the search space, a subband to which the configuration information of the CORESET is to be applied, from among at least one subband within a bandwidth part, wherein the at least one subband is identified based on gap information configured from a base station and the gap information includes a number of resource blocks (RBs) indicating a gap between the at least one subband;
    identifying the CORESET in the subband based on a result of the determining; and
    monitoring the identified CORESET for reception of a physical downlink control channel (PDCCH),
    wherein the subband to which the configuration information of the CORESET is applied is determined based on the gap information.

2. The method of claim 1,
    wherein the configuration information of the search space comprises bitmap information indicating the subband to which the configuration information of the CORESET is to be applied, and
    wherein the configuration information of the CORESET comprises bitmap information indicating a frequency resource of the CORESET.

3. The method of claim 1, wherein the identifying of the CORESET comprises:
    when the configuration information of the CORESET does not include configuration information of an offset value or the offset value is set to a default value, and the configuration information of the search space does not include bitmap information indicating the subband to which the configuration information of the CORESET is to be applied, identifying the CORESET based on bitmap information included in the configuration information of the CORESET and indicating a frequency resource of the CORESET in units of a group of 6 physical RBs (PRBs) based on a common RB (CRB) in the bandwidth part.

4. The method of claim 1, wherein the identifying of the CORESET comprises, when the configuration information of the CORESET includes configuration information of an offset value and the configuration information of the search space does not include bitmap information indicating the subband to which the configuration information of the CORESET is to be applied, identifying the CORESET based on the offset value and bitmap information included in the configuration information of the CORESET and indicating a frequency resource of the CORESET in units of a group of 6 physical RBs (PRBs) based on a common RB (CRB) in the bandwidth part.

5. The method of claim 1, wherein the identifying of the CORESET comprises:
    when the configuration information of the CORESET does not include configuration information of an offset value or the offset value is set to a default value, and the configuration information of the search space includes bitmap information indicating the subband to which the configuration information of the CORESET is to be applied, identifying the CORESET based on bitmap information included in the configuration information of the CORESET and indicating a frequency resource of the CORESET in units of a group of 6 physical RBs (PRBs) based on a starting PRB of the subband to which the configuration information of the CORESET is to be applied.

6. The method of claim 1, wherein the identifying of the CORESET comprises:
    when the configuration information of the CORESET includes configuration information of an offset value and the configuration information of the search space includes bitmap information indicating the subband to which the configuration information of the CORESET is to be applied, identifying the CORESET based on the offset value and bitmap information included in the configuration information of the CORESET and indicating a frequency resource of the CORESET in units of a group of 6 physical RBs (PRBs) based on a starting PRB of the subband to which the configuration information of the CORESET is to be applied.

7. The method of claim 1, wherein the monitoring of the identified CORESET comprises monitoring only at least one subband determined to be an idle band from among the at least one subband.

8. The method of claim 1, further comprising:
    receiving information about a result of performing a channel access procedure from the base station,
    wherein predetermined PDCCH candidates are not monitored in a subband determined to be unavailable based on the received result of performing the channel access procedure.

9. A method of performing communication by a base station configuring a control resource set (CORESET) in a wireless communication system, the method comprising:
    transmitting, via a higher layer signal, configuration information of a CORESET and configuration information of a search space; and
    transmitting a physical downlink control channel (PDCCH) via the CORESET in a subband to which the configuration information of the CORESET is applied, among at least one subband within a bandwidth part, which is determined based on the configuration information of the search space, wherein the at least one subband is identified based on gap information configured from the base station and the gap information includes a number of resource blocks (RBs) indicating a gap between the at least one subband, wherein the subband in which the configuration information of the CORESET is applied is determined based on the gap information.

10. A user equipment configured with a control resource set (CORESET) by a base station in a wireless communication system, the user equipment comprising:

a transceiver; and a processor combined with the transceiver and configured to:

receive, via a higher layer signal, configuration information of a CORESET and configuration information of a search space, determine, based on the configuration information of the search space, a subband to which the configuration information of the CORESET is to be applied, from among at least one subband within a bandwidth part, wherein the at least one subband is identified based on gap information configured from a base station and the gap information includes a number of resource blocks (RBs) indicating a gap between the at least one subband, identify the CORESET in the subband based on a result of the determining, and monitor the identified CORESET for reception of a physical downlink control channel (PDCCH), wherein the subband to which the configuration information of the CORESET is applied is determined based on the gap information.

11. The user equipment of claim 10, wherein the configuration information of the search space comprises bitmap information indicating the subband to which the configuration information of the CORESET is to be applied, and wherein the configuration information of the CORESET comprises bitmap information indicating a frequency resource of the CORESET.

12. The user equipment of claim 10, wherein the processor is further configured to:

when the configuration information of the CORESET does not include configuration information of an offset value or the offset value is set to a default value, and the configuration information of the search space does not include bitmap information indicating the subband to which the configuration information of the CORESET is to be applied, identify the CORESET based on bitmap information included in the configuration information of the CORESET and indicating a frequency resource of the CORESET in units of a group of 6 physical RBs (PRBs) based on a common RB (CRB) in the bandwidth part.

13. The user equipment of claim 10, wherein the processor is further configured to:

when the configuration information of the CORESET includes configuration information of an offset value and the configuration information of the search space does not include bitmap information indicating the subband to which the configuration information of the CORESET is to be applied, identify the CORESET based on the offset value and bitmap information included in the configuration information of the CORE-SET and indicating a frequency resource of the CORESET in units of a group of 6 physical RBs (PRBs) based on a common RB (CRB) in the bandwidth part.

14. The user equipment of claim 10, wherein the processor is further configured to:

when the configuration information of the CORESET does not include configuration information of an offset value or the offset value is set to a default value, and the configuration information of the search space includes bitmap information indicating the subband to which the configuration information of the CORESET is to be applied, identify the CORESET based on bitmap information included in the configuration information of the CORESET and indicating a frequency resource of the CORESET in units of a group of 6 physical RBs (PRBs) based on a starting PRB of the subband to which the configuration information of the CORESET is to be applied.

15. The user equipment of claim 10, wherein the processor is further configured to:

when the configuration information of the CORESET includes configuration information of an offset value and the configuration information of the search space includes bitmap information indicating the subband to which the configuration information of the CORESET is to be applied, identify the CORESET based on the offset value and bitmap information included in the configuration information of the CORESET and indicating a frequency resource of the CORESET in units of a group of 6 physical RBs (PRBs) based on a starting PRB of the subband to which the configuration information of the CORESET is to be applied.

16. The user equipment of claim 10, wherein the processor is further configured to monitor only at least one subband determined to be an idle band from among the at least one subband.

17. The user equipment of claim 10, wherein the processor is further configured to receive information about a result of performing a channel access procedure from the base station, and wherein predetermined PDCCH candidates are not monitored in a subband determined to be unavailable based on the received result of performing the channel access procedure.

18. A base station for configuring a control resource set (CORESET) in a wireless communication system, the base station comprising:

a transceiver; and a processor combined with the transceiver and configured to:

transmit, via a higher layer signal, configuration information of a CORESET and configuration information of a search space, and transmit a physical downlink control channel (PDCCH) via the CORESET in a subband to which the configuration information of the CORESET is applied, among at least one subband within a bandwidth part, which is determined based on the configuration information of the search space, wherein the at least one subband is identified based on gap information configured from the base station and the gap information includes a number of resource blocks (RBs) indicating a gap between the at least one subband, wherein the subband in which the configuration information of the CORESET is applied is determined based on the gap information.

* * * * *